(12) United States Patent
Huang et al.

(10) Patent No.: US 12,403,974 B2
(45) Date of Patent: Sep. 2, 2025

(54) ELECTRIC SCOOTER

(71) Applicant: RAZOR USA LLC, Cerritos, CA (US)

(72) Inventors: Joey Chih-Wei Huang, Temple City, CA (US); Robert Chen, San Marino, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 18/656,005

(22) Filed: May 6, 2024

(65) Prior Publication Data

US 2024/0359763 A1   Oct. 31, 2024

Related U.S. Application Data

(63) Continuation of application No. 16/263,801, filed on Jan. 31, 2019, now Pat. No. 11,975,794, which is a
(Continued)

(51) Int. Cl.
*B62J 43/13* (2020.01)
*B60K 1/04* (2019.01)
(Continued)

(52) U.S. Cl.
CPC ............. *B62J 43/13* (2020.02); *B60K 1/04* (2013.01); *B60K 7/0007* (2013.01); *B60K 17/043* (2013.01); *B60K 17/26* (2013.01); *B62J 43/28* (2020.02); *B62K 3/002* (2013.01); *B62K 15/006* (2013.01); *B62K 19/40* (2013.01); *B62M 11/02* (2013.01); *B60K 2001/0438* (2013.01); *B60K 2001/0455* (2013.01); *B60K 2001/0483* (2013.01); *B60K 2001/0494* (2013.01);
(Continued)

(58) Field of Classification Search
CPC .. B62J 43/13; B62J 43/28; B60K 1/04; B60K 7/0007; B60K 2001/0438; B60K 2001/0455; B60Y 2200/126
See application file for complete search history.

(56) References Cited

U.S. PATENT DOCUMENTS

| | | |
|---|---|---|
| 213,546 A | 3/1879 | Cornelius |
| 215,081 A | 5/1879 | Turnbull |
| (Continued) | | |

FOREIGN PATENT DOCUMENTS

| | | |
|---|---|---|
| AU | 2005100475 | 6/2005 |
| CH | 598051 | 4/1978 |
| (Continued) | | |

OTHER PUBLICATIONS https://www.amazon.com/Razor-Turbo-Jetts-Electric-Wheels/dp/BK07H6RB4MX?th=1 (Year: 2018).
(Continued)

*Primary Examiner* — Valentin Neacsu
*Assistant Examiner* — Michael R Stabley
(74) *Attorney, Agent, or Firm* — Knobbe, Martens, Olson & Bear, LLP

(57) ABSTRACT

Various personal mobility vehicles, such as scooters, are disclosed. The scooter can include at least one battery and motor for powering at least one driven wheel. The vehicle can include a gear assembly to convert a torque produced by the motor to a different torque to a driven shaft to power the at least one driven wheel. The battery can be removable.

22 Claims, 18 Drawing Sheets

Related U.S. Application Data continuation of application No. 15/409,488, filed on Jan. 18, 2017, now abandoned, and a continuation-in-part of application No. 29/577,038, filed on Sep. 8, 2016, now Pat. No. Des. 818,541.

(60) Provisional application No. 62/286,124, filed on Jan. 22, 2016, provisional application No. 62/340,978, filed on May 24, 2016.

(51) Int. Cl.

| | | |
|---|---|---|
| *B60K 7/00* | (2006.01) | |
| *B60K 17/04* | (2006.01) | |
| *B60K 17/26* | (2006.01) | |
| *B62J 43/28* | (2020.01) | |
| *B62K 3/00* | (2006.01) | |
| *B62K 15/00* | (2006.01) | |
| *B62K 19/40* | (2006.01) | |
| *B62M 11/02* | (2006.01) | |
| *B62J 50/22* | (2020.01) | |

(52) U.S. Cl.
 CPC .......... *B60K 2007/0046* (2013.01); *B60K 2007/0061* (2013.01); *B60Y 2200/126* (2013.01); *B62J 50/22* (2020.02); *B62K 2204/00* (2013.01)

(56) References Cited

U.S. PATENT DOCUMENTS

| | | |
|---|---|---|
| 252,970 A | 1/1882 | Price et al. |
| 253,735 A | 2/1882 | Marshall |
| 304,949 A | 9/1884 | Mitchell |
| 311,936 A | 2/1885 | Wisewell |
| 319,839 A | 6/1885 | Nelson |
| 321,434 A | 7/1885 | Hanson |
| 321,466 A | 7/1885 | Wall |
| 329,927 A | 11/1885 | Mendenhall |
| 1,018,512 A | 2/1912 | Mees |
| 1,075,250 A | 10/1913 | Gingold |
| 1,194,102 A | 8/1916 | Webb |
| 1,387,091 A | 8/1921 | Woolley et al. |
| 1,550,985 A | 8/1925 | Schluesselburg |
| 1,603,529 A | 10/1926 | Faust |
| 1,632,997 A | 6/1927 | Connolly |
| 1,728,063 A | 9/1929 | James |
| 1,784,761 A | 12/1930 | Smith |
| 1,854,188 A | 4/1932 | Gregory |
| 1,935,187 A | 11/1933 | Kitselman |
| 2,051,762 A | 8/1936 | Vincent |
| 2,077,274 A | 4/1937 | Silkman |
| 2,086,471 A | 7/1937 | Chapman |
| 2,126,359 A | 8/1938 | Vogt |
| 2,136,306 A | 11/1938 | McCloy |
| 2,216,359 A | 10/1940 | Spencer |
| 2,413,530 A | 12/1946 | Taylor |
| 2,430,037 A | 11/1947 | Vincent |
| 2,460,395 A | 2/1949 | Reid |
| 2,474,082 A | 6/1949 | Wutz |
| 2,509,324 A | 5/1950 | Horn |
| 2,857,008 A | 10/1958 | Antonio |
| 3,087,739 A | 4/1963 | Ware |
| 3,252,713 A | 5/1966 | Heller |
| 3,288,251 A | 11/1966 | Sakwa |
| 3,331,612 A | 7/1967 | Tietge |
| D214,252 S | 5/1969 | Andersen |
| 3,476,399 A | 11/1969 | Finn |
| 3,570,620 A | 3/1971 | Fischer et al. |
| 3,671,055 A | 6/1972 | Aarup |
| D226,440 S | 3/1973 | Bentley |
| 4,003,582 A | 1/1977 | Maurer |
| 4,037,852 A | 7/1977 | Bayer et al. |
| 4,043,566 A | 8/1977 | Johnson |
| 4,058,323 A | 11/1977 | Ware, Jr. |
| 4,061,350 A | 12/1977 | Schmidt, Jr. et al. |
| 4,094,372 A | 6/1978 | Notter |
| 4,127,282 A | 11/1978 | Gorlach |
| 4,152,001 A | 5/1979 | Christianson |
| 4,168,076 A | 9/1979 | Johnson |
| 4,180,278 A | 12/1979 | Gottlieb |
| 4,185,847 A | 1/1980 | Johnson |
| 4,272,091 A | 6/1981 | Ried, Jr. |
| 4,398,735 A | 8/1983 | Evans et al. |
| 4,402,521 A | 9/1983 | Mongeon |
| 4,403,784 A | 9/1983 | Gray |
| 4,417,737 A | 11/1983 | Suroff |
| 4,504,072 A | 3/1985 | Klawitter |
| 4,508,187 A | 4/1985 | Wenzel |
| 4,523,767 A | 6/1985 | Le Page |
| 4,546,841 A | 10/1985 | Sipiano |
| 4,645,223 A | 2/1987 | Grossman |
| 4,681,333 A | 7/1987 | Rouge et al. |
| 4,708,352 A | 11/1987 | Vullierme |
| 4,709,937 A | 12/1987 | Lin et al. |
| 4,738,456 A | 4/1988 | Creason |
| D299,260 S | 1/1989 | Vullierme |
| 4,842,091 A | 6/1989 | Badsey |
| 4,844,491 A | 7/1989 | Wheelwright |
| 4,930,794 A | 6/1990 | Chan |
| 4,955,626 A | 9/1990 | Smith et al. |
| 4,998,358 A | 3/1991 | Girardelli |
| 5,046,747 A | 9/1991 | Nielsen |
| 5,062,630 A | 11/1991 | Nelson |
| 5,092,614 A | 3/1992 | Malewicz |
| D326,290 S | 5/1992 | Badsey |
| 5,143,388 A | 9/1992 | Chen |
| 5,232,235 A | 8/1993 | Brooks |
| 5,236,058 A | 8/1993 | Yamet et al. |
| 5,263,725 A | 11/1993 | Gesmer et al. |
| 5,330,026 A | 7/1994 | Hsu et al. |
| 5,347,681 A | 9/1994 | Wattron et al. |
| 5,513,863 A | 5/1996 | Klamer et al. |
| 5,513,865 A | 5/1996 | Brooks et al. |
| 5,547,204 A | 8/1996 | Gamzo |
| 5,662,187 A | 9/1997 | McGovern |
| 5,730,241 A | 3/1998 | Shyr et al. |
| 5,741,018 A | 4/1998 | Huang |
| D395,479 S | 6/1998 | Gamzo |
| 5,775,452 A * | 7/1998 | Patmont .............. B62K 3/002 180/181 |
| 5,797,466 A | 8/1998 | Gendle |
| 5,829,543 A | 11/1998 | Diaz |
| 5,848,660 A | 12/1998 | McGreen |
| 5,860,657 A | 1/1999 | Kroher |
| D410,268 S | 5/1999 | Yung |
| 5,915,707 A | 6/1999 | Steffen |
| 5,950,754 A | 9/1999 | Ondrish, Jr. |
| 5,971,411 A | 10/1999 | Jones et al. |
| 5,997,018 A | 12/1999 | Lee |
| D421,282 S | 2/2000 | Orr |
| 6,029,763 A | 2/2000 | Swisher |
| 6,050,357 A | 4/2000 | Staelin et al. |
| D424,979 S | 5/2000 | Hanagan et al. |
| 6,059,062 A | 5/2000 | Staelin |
| 6,070,885 A | 6/2000 | Ferone |
| 6,079,724 A | 6/2000 | Lin |
| 6,139,035 A | 10/2000 | Tsai |
| D433,718 S | 11/2000 | Mcgreen |
| 6,158,752 A | 12/2000 | Kay |
| D435,873 S | 1/2001 | Lee |
| D435,874 S | 1/2001 | Cheng |
| 6,179,307 B1 | 1/2001 | Mao |
| 6,189,898 B1 | 2/2001 | Benoit |
| D438,911 S | 3/2001 | Chen |
| D438,912 S | 3/2001 | Barrera |
| D439,623 S | 3/2001 | Barrera |
| 6,199,652 B1 | 3/2001 | Mastroianni et al. |
| 6,206,387 B1 | 3/2001 | Tsai |
| 6,206,388 B1 | 3/2001 | Ouboter |
| 6,227,324 B1 | 5/2001 | Sauve |
| 6,234,501 B1 | 5/2001 | Chen |
| 6,241,264 B1 | 6/2001 | Page |

(56) References Cited

U.S. PATENT DOCUMENTS

| | | |
|---|---|---|
| D444,824 S | 7/2001 | Udwin et al. |
| D445,145 S | 7/2001 | Yang |
| D446,259 S | 8/2001 | Udwin et al. |
| D447,187 S | 8/2001 | Powers |
| D447,188 S | 8/2001 | Lan |
| 6,270,095 B1 | 8/2001 | Chang |
| 6,273,205 B1 | 8/2001 | Tsai |
| 6,283,485 B1 | 9/2001 | Tsai |
| 6,286,632 B1 | 9/2001 | Chai |
| 6,286,843 B1 | 9/2001 | Lin |
| 6,296,082 B1 | 10/2001 | Tsai |
| 6,298,952 B1 | 10/2001 | Tsai |
| 6,299,186 B1 | 10/2001 | Kao et al. |
| 6,302,415 B1 | 10/2001 | Wang et al. |
| D450,355 S | 11/2001 | Chan |
| D452,284 S | 12/2001 | McGinnis |
| D453,198 S | 1/2002 | Dudley |
| D453,804 S | 2/2002 | Robinson |
| 6,345,678 B1 | 2/2002 | Chang |
| 6,345,827 B1 | 2/2002 | Benoit |
| D454,377 S | 3/2002 | Hsu et al. |
| 6,352,270 B1 | 3/2002 | Wu |
| D456,460 S | 4/2002 | Tseng |
| 6,378,880 B1 | 4/2002 | Lin |
| 6,382,366 B1 | 5/2002 | Chang |
| 6,386,330 B1 | 5/2002 | Wei |
| 6,394,213 B1 | 5/2002 | Tsai |
| 6,406,039 B1 | 6/2002 | Chen |
| 6,409,190 B1 | 6/2002 | Tsai |
| D459,761 S | 7/2002 | Chen |
| 6,416,060 B1 | 7/2002 | Chen |
| 6,416,063 B1 | 7/2002 | Stillinger et al. |
| 6,428,021 B1 | 8/2002 | Tung |
| 6,428,050 B1 | 8/2002 | Brandley et al. |
| 6,431,568 B1 | 8/2002 | McCleese |
| 6,435,528 B1 | 8/2002 | Tsai |
| 6,443,470 B1 | 9/2002 | Ulrich et al. |
| D464,379 S | 10/2002 | Lin |
| 6,462,493 B2 | 10/2002 | Lan |
| 6,467,560 B1 | 10/2002 | Anderson |
| 6,481,728 B2 | 11/2002 | Chen |
| 6,481,729 B2 | 11/2002 | Herman et al. |
| 6,481,913 B2 | 11/2002 | Chen |
| D468,236 S | 1/2003 | Pollitzer et al. |
| D471,597 S | 3/2003 | Chen |
| D471,598 S | 3/2003 | Chen |
| 6,533,054 B1 | 3/2003 | Fey |
| D472,596 S | 4/2003 | Schnuckle et al. |
| D473,905 S | 4/2003 | Schnuckle et al. |
| D475,093 S | 5/2003 | Furter et al. |
| 6,557,861 B2 | 5/2003 | Saylor |
| 6,557,873 B2 | 5/2003 | Nardone |
| 6,604,593 B1 | 8/2003 | Mullet |
| 6,612,592 B1 | 9/2003 | Soo |
| 6,619,416 B2 | 9/2003 | Lan |
| 6,619,679 B2 | 9/2003 | Lan |
| D482,750 S | 11/2003 | Magerer et al. |
| 6,672,607 B2 | 1/2004 | Chung |
| 6,676,138 B1 | 1/2004 | Rosso |
| 6,679,505 B2 | 1/2004 | Yang |
| D486,532 S | 2/2004 | Christianson |
| 6,739,421 B1 | 5/2004 | Miya |
| D492,367 S | 6/2004 | Dennis |
| 6,796,394 B1 | 9/2004 | Lin |
| D497,397 S | 10/2004 | Sramek |
| 6,832,660 B2 | 12/2004 | Dodd |
| 6,863,283 B1 | 3/2005 | Houston et al. |
| D505,469 S | 5/2005 | Joung et al. |
| D513,629 S | 1/2006 | Sramek |
| 6,981,711 B2 | 1/2006 | Seta |
| D516,132 S | 2/2006 | Sramek |
| 7,007,977 B1 | 3/2006 | Gallagher |
| 7,040,443 B1 * | 5/2006 | Roth ............... B62K 15/006 180/68.5 |
| D527,536 S | 9/2006 | Mcoy |
| 7,150,461 B2 | 12/2006 | Schnuckle et al. |
| 7,156,405 B1 | 1/2007 | Ming |
| 7,163,210 B1 | 1/2007 | Rehkemper et al. |
| 7,204,330 B1 | 4/2007 | Lauren |
| 7,214,337 B2 | 5/2007 | Grande |
| 7,226,063 B2 | 6/2007 | Paddock |
| 7,232,139 B2 | 6/2007 | Cole |
| 7,351,265 B2 | 4/2008 | Vitale et al. |
| D569,447 S | 5/2008 | Thomas |
| D574,296 S | 8/2008 | Keski-Luopa |
| 7,419,171 B1 | 9/2008 | Ka |
| 7,431,110 B2 | 10/2008 | Greenwood et al. |
| D579,987 S | 11/2008 | Hong |
| D581,991 S | 12/2008 | Armand et al. |
| 7,584,974 B2 | 9/2009 | Jackman et al. |
| D603,463 S | 11/2009 | Jessie, Jr. |
| 7,610,972 B2 | 11/2009 | Adams et al. |
| 7,654,356 B2 | 2/2010 | Wu |
| 7,712,937 B2 * | 5/2010 | Grossman ............... B62K 3/002 362/249.02 |
| D623,701 S | 9/2010 | Dalgard et al. |
| 7,900,731 B2 | 3/2011 | McKinzie |
| 7,976,035 B2 | 7/2011 | Chan |
| 7,980,567 B2 | 7/2011 | Yu et al. |
| 7,988,159 B2 | 8/2011 | Chen |
| D645,522 S | 9/2011 | Powers et al. |
| 8,025,300 B1 | 9/2011 | Jordan |
| D654,963 S | 2/2012 | Powers et al. |
| D656,560 S | 3/2012 | Patterson et al. |
| 8,146,947 B2 | 4/2012 | Hadley |
| 8,186,693 B2 | 5/2012 | Kortschot |
| 8,251,377 B2 | 8/2012 | Green et al. |
| 8,292,018 B2 | 10/2012 | Huang |
| 8,292,308 B2 | 10/2012 | Green et al. |
| D671,600 S | 11/2012 | Horne |
| D672,400 S | 12/2012 | Pizzi |
| 8,348,284 B2 | 1/2013 | Green |
| D678,124 S | 3/2013 | Canni et al. |
| D681,759 S | 5/2013 | Treadway et al. |
| D684,217 S | 6/2013 | Hadley |
| D686,674 S | 7/2013 | Hadley et al. |
| 8,490,985 B2 | 7/2013 | Landau |
| D687,499 S | 8/2013 | Horne |
| D691,671 S | 10/2013 | Chen et al. |
| D692,963 S | 11/2013 | Radtke et al. |
| D693,414 S | 11/2013 | Hadley et al. |
| D695,644 S | 12/2013 | Timonen |
| D698,868 S | 2/2014 | Chan |
| 8,662,508 B2 * | 3/2014 | Grossman ............... A63C 17/26 280/87.041 |
| 8,668,039 B2 | 3/2014 | Tuli |
| 8,672,074 B2 | 3/2014 | Ganeous |
| 8,684,121 B2 | 4/2014 | Treadway |
| 8,727,359 B2 | 5/2014 | Green |
| D710,949 S | 8/2014 | Huang |
| 8,801,009 B2 * | 8/2014 | Sapir ..................... B62K 3/002 280/87.05 |
| 8,813,892 B2 | 8/2014 | Hadley et al. |
| D714,396 S | 9/2014 | Talios |
| D715,870 S | 10/2014 | Talios |
| 8,851,215 B2 | 10/2014 | Goto |
| 8,870,200 B2 | 10/2014 | Chen |
| D717,881 S | 11/2014 | Radtke et al. |
| 8,925,935 B2 | 1/2015 | Powers et al. |
| 8,985,602 B2 | 3/2015 | Chan |
| D727,833 S | 4/2015 | Talios et al. |
| 9,027,690 B2 | 5/2015 | Chavand |
| 9,045,189 B2 | 6/2015 | Lovley, II et al. |
| 9,056,241 B2 | 6/2015 | Green |
| D736,324 S | 8/2015 | Lu et al. |
| 9,114,821 B1 | 8/2015 | Xu |
| D738,435 S | 9/2015 | O'Connell |
| D741,969 S | 10/2015 | Green |
| D748,738 S | 2/2016 | Hadley et al. |
| D750,180 S | 2/2016 | Edlauer |
| 9,321,504 B2 | 4/2016 | Hadley et al. |
| D755,899 S | 5/2016 | Castrucci et al. |
| D756,464 S | 5/2016 | Edlauer |
| D756,465 S | 5/2016 | Byrne et al. |

(56) References Cited

U.S. PATENT DOCUMENTS

| | | |
|---|---|---|
| 9,339,720 B2 | 5/2016 | Kortschot |
| D764,615 S | 8/2016 | Treadway et al. |
| 9,452,345 B2 | 9/2016 | Doerksen et al. |
| D772,990 S | 11/2016 | Allais |
| D774,145 S | 12/2016 | Hadley et al. |
| D774,601 S | 12/2016 | Mizrahi et al. |
| D777,844 S | 1/2017 | Connell |
| D778,806 S | 2/2017 | Welford |
| 9,592,876 B2 | 3/2017 | Lovley, II et al. |
| 9,616,318 B2 | 4/2017 | Rogers |
| 9,630,085 B2 | 4/2017 | Treadway et al. |
| 9,660,500 B2 | 5/2017 | Huang |
| 9,682,309 B2 | 6/2017 | Huang |
| 9,764,218 B2 | 9/2017 | Treadway et al. |
| 9,808,705 B2 | 11/2017 | Treadway et al. |
| D806,176 S | 12/2017 | Peng |
| D810,623 S | 2/2018 | Adcock |
| D810,836 S | 2/2018 | Hadley |
| D811,489 S | 2/2018 | Hadley et al. |
| 9,919,200 B2 | 3/2018 | Mo |
| D815,215 S | 4/2018 | Desberg |
| 9,950,244 B1 | 4/2018 | Sargis |
| D817,228 S | 5/2018 | Kroll et al. |
| D818,541 S | 5/2018 | Huang |
| 9,956,473 B2 | 5/2018 | Chiu |
| 9,987,547 B2 | 6/2018 | Ruschkowski |
| D824,805 S | 8/2018 | Karka |
| 10,071,303 B2 | 9/2018 | Pikulski |
| D829,826 S | 10/2018 | Liu et al. |
| D830,468 S | 10/2018 | Liu |
| 10,099,745 B2 | 10/2018 | Hadley et al. |
| D834,097 S | 11/2018 | Lin et al. |
| 10,124,851 B2 | 11/2018 | Lovley, II et al. |
| 10,137,356 B2 | 11/2018 | Kortschot |
| D836,727 S | 12/2018 | Wilson et al. |
| 10,144,480 B2 | 12/2018 | Tan et al. |
| D837,303 S | 1/2019 | Desberg |
| D839,358 S | 1/2019 | Cao |
| D839,359 S | 1/2019 | Hadley |
| 10,189,533 B2 | 1/2019 | Lovley, II et al. |
| D842,409 S | 3/2019 | Novick |
| D842,758 S | 3/2019 | Hall et al. |
| D849,153 S | 5/2019 | Zhang et al. |
| D849,601 S | 5/2019 | Li et al. |
| D855,115 S | 7/2019 | Yan |
| D858,646 S | 9/2019 | Yang |
| D861,538 S | 10/2019 | Frahm |
| D866,675 S | 11/2019 | Desberg |
| D872,192 S | 1/2020 | Hadley |
| D873,349 S | 1/2020 | Huang |
| 10,737,743 B2 | 8/2020 | Hadley et al. |
| D901,595 S | 11/2020 | Chen |
| D905,794 S | 12/2020 | Liu et al. |
| D910,121 S | 2/2021 | Liu et al. |
| D910,766 S | 2/2021 | Hadley |
| D911,455 S | 2/2021 | Huang |
| D912,180 S | 3/2021 | Desberg et al. |
| D914,102 S | 3/2021 | Hadley et al. |
| 10,933,299 B2 | 3/2021 | Zhang et al. |
| D916,985 S | 4/2021 | Wu et al. |
| D921,765 S | 6/2021 | Ostergaard |
| D923,715 S | 6/2021 | Wang et al. |
| 11,033,799 B2 | 6/2021 | Kortschot |
| 11,038,235 B2 | 6/2021 | Ye |
| 11,084,550 B2 | 8/2021 | Aguilar Ruelas et al. |
| D936,151 S | 11/2021 | Lisle et al. |
| D936,152 S | 11/2021 | Yao et al. |
| D936,750 S | 11/2021 | Wu et al. |
| D940,251 S | 1/2022 | Wang et al. |
| D941,928 S | 1/2022 | Hadley |
| D941,929 S | 1/2022 | Huang |
| D941,930 S | 1/2022 | Hadley |
| D949,748 S | 4/2022 | Lu |
| 11,305,830 B2 | 4/2022 | Bartolotta et al. |
| 11,338,883 B2 | 5/2022 | Hadley et al. |
| D957,532 S | 7/2022 | Wang et al. |
| D958,257 S | 7/2022 | Cai et al. |
| D964,473 S | 9/2022 | Lu |
| D972,040 S | 12/2022 | Lisle et al. |
| D976,333 S | 1/2023 | Chen et al. |
| D977,018 S | 1/2023 | Lu |
| 11,565,169 B2 | 1/2023 | Kortschot |
| D977,602 S | 2/2023 | Desberg et al. |
| 11,697,469 B2 | 7/2023 | Desberg et al. |
| 11,697,470 B1 | 7/2023 | Wang |
| 11,707,666 B2 | 7/2023 | Zhang et al. |
| D995,651 S | 8/2023 | Hadley |
| D995,652 S | 8/2023 | Huang |
| D1,010,013 S | 1/2024 | Hadley |
| D1,020,912 S | 4/2024 | Desberg et al. |
| 11,975,794 B2 | 5/2024 | Huang |
| D1,029,949 S | 6/2024 | Huang et al. |
| 12,011,654 B2 | 6/2024 | Desberg et al. |
| D1,039,060 S | 8/2024 | Hadley |
| 12,054,221 B2 | 8/2024 | Hadley et al. |
| 12,059,971 B2 | 8/2024 | Desberg et al. |
| D1,050,269 S | 11/2024 | McDonald |
| 12,145,686 B2 | 11/2024 | Desberg et al. |
| D1,053,956 S | 12/2024 | McDonald |
| D1,066,512 S | 3/2025 | Hadley |
| 12,257,492 B2 | 3/2025 | Kortschot |
| D1,072,062 S | 4/2025 | Alferez et al. |
| 2001/0030405 A1 | 10/2001 | Wu et al. |
| 2002/0000339 A1* | 1/2002 | Tsai .................. B62J 43/28 |
| | | 180/220 |
| 2002/0005309 A1 | 1/2002 | Patmont et al. |
| 2002/0066610 A1 | 6/2002 | Tsai |
| 2002/0067014 A1 | 6/2002 | Heringer et al. |
| 2002/0074756 A1 | 6/2002 | Tsai |
| 2002/0079662 A1 | 6/2002 | Lee |
| 2002/0079855 A1 | 6/2002 | Parks |
| 2002/0093161 A1 | 7/2002 | Udwin et al. |
| 2002/0096843 A1 | 7/2002 | Wei |
| 2002/0096850 A1 | 7/2002 | Lu |
| 2002/0105152 A1 | 8/2002 | Miller |
| 2002/0108798 A1 | 8/2002 | Huntsberger et al. |
| 2002/0109313 A1 | 8/2002 | Johnsen |
| 2002/0117825 A1 | 8/2002 | Ho |
| 2002/0134604 A1 | 9/2002 | Lan |
| 2002/0140194 A1 | 10/2002 | Shaw |
| 2002/0145264 A1 | 10/2002 | Hung |
| 2002/0149165 A1 | 10/2002 | Lin |
| 2002/0158437 A1 | 10/2002 | Carbonero |
| 2002/0167146 A1 | 11/2002 | Chang |
| 2002/0170763 A1 | 11/2002 | Townsend |
| 2002/0180169 A1 | 12/2002 | Kwok |
| 2003/0020244 A1 | 1/2003 | Sung |
| 2003/0029652 A1* | 2/2003 | Lan .................. B62M 6/90 |
| | | 180/68.5 |
| 2003/0042058 A1 | 3/2003 | Chen |
| 2003/0127816 A1 | 7/2003 | Schnuckle et al. |
| 2003/0168273 A1 | 9/2003 | Ducharme et al. |
| 2003/0221888 A1 | 12/2003 | McKinney, Jr. et al. |
| 2004/0041359 A1 | 3/2004 | Im |
| 2004/0050603 A1 | 3/2004 | Jaeger |
| 2004/0129472 A1 | 7/2004 | Cheng |
| 2004/0217562 A1 | 11/2004 | Haugen et al. |
| 2005/0006859 A1 | 1/2005 | Farrelly et al. |
| 2005/0006866 A1 | 1/2005 | Chen |
| 2005/0012289 A1 | 1/2005 | Wang et al. |
| 2005/0012290 A1 | 1/2005 | McClain |
| 2005/0116430 A1 | 6/2005 | Chen |
| 2005/0121866 A1 | 6/2005 | Kamen et al. |
| 2005/0127629 A1 | 6/2005 | Nelson et al. |
| 2005/0173175 A1 | 8/2005 | Lee |
| 2005/0194759 A1 | 9/2005 | Chen |
| 2005/0229698 A1 | 10/2005 | Beecroft et al. |
| 2006/0049595 A1 | 3/2006 | Crigler et al. |
| 2006/0125200 A1 | 6/2006 | Cole |
| 2006/0279055 A1 | 12/2006 | Morabito |
| 2007/0045976 A1 | 3/2007 | Wu |
| 2007/0126191 A1 | 6/2007 | Kay, III |
| 2008/0197594 A1 | 8/2008 | Ling |
| 2008/0203691 A1 | 8/2008 | Hsu |

(56) References Cited

U.S. PATENT DOCUMENTS

| | | |
|---|---|---|
| 2009/0071740 A1 | 3/2009 | Palmer |
| 2009/0160150 A1 | 6/2009 | Johnson |
| 2009/0200768 A1 | 8/2009 | Armand et al. |
| 2009/0273152 A1 | 11/2009 | Chung |
| 2009/0321193 A1 | 12/2009 | Jackman et al. |
| 2010/0090422 A1 | 4/2010 | Chan et al. |
| 2010/0123295 A1 | 5/2010 | Landau |
| 2010/0133765 A1 | 6/2010 | Chen |
| 2011/0011657 A1 | 1/2011 | Donnell et al. |
| 2011/0031711 A1 | 2/2011 | Grossman |
| 2011/0056177 A1 | 3/2011 | Goto |
| 2012/0086181 A1 | 4/2012 | Kinnaman |
| 2013/0026734 A1 | 1/2013 | Zhang et al. |
| 2013/0081891 A1 | 4/2013 | Ulmen et al. |
| 2013/0087983 A1 | 4/2013 | Ngai |
| 2013/0186698 A1 | 7/2013 | Sarokhan |
| 2013/0270016 A1 | 10/2013 | Donnell et al. |
| 2013/0282216 A1 | 10/2013 | Edney |
| 2013/0320648 A1 | 12/2013 | Eckert et al. |
| 2014/0090916 A1 | 4/2014 | Lovley, II et al. |
| 2014/0158446 A1 | 6/2014 | Treadway |
| 2014/0196968 A1* | 7/2014 | Bieler .............. B62M 6/65 180/181 |
| 2014/0332297 A1 | 11/2014 | Kortschot |
| 2015/0196831 A1 | 7/2015 | Treadway et al. |
| 2015/0306511 A1 | 10/2015 | Norman et al. |
| 2015/0352430 A1 | 12/2015 | Treadway et al. |
| 2016/0129963 A1 | 5/2016 | Ying et al. |
| 2016/0213999 A1 | 7/2016 | Treadway et al. |
| 2016/0256767 A1 | 9/2016 | Cerboneschi |
| 2016/0311322 A1 | 10/2016 | Lagant et al. |
| 2016/0318578 A1 | 11/2016 | Heber et al. |
| 2017/0182397 A1 | 6/2017 | Zhang |
| 2017/0182398 A1 | 6/2017 | Garcia Elena |
| 2017/0240239 A1 | 8/2017 | Huang et al. |
| 2017/0259162 A1 | 9/2017 | Mo |
| 2018/0029659 A1 | 2/2018 | Desberg |
| 2019/0084605 A1 | 3/2019 | Berendzen et al. |
| 2019/0263468 A1* | 8/2019 | Huang ............... B62K 15/00 |
| 2020/0307735 A1 | 10/2020 | Paris et al. |
| 2021/0236910 A1 | 8/2021 | Behrmann |
| 2022/0006959 A1 | 1/2022 | Chen et al. |
| 2022/0041243 A1 | 2/2022 | Qiao |
| 2022/0048402 A1 | 2/2022 | Desberg et al. |
| 2022/0204112 A1 | 6/2022 | Sun et al. |
| 2022/0348284 A1 | 11/2022 | Hadley et al. |
| 2023/0127757 A1 | 4/2023 | Lovley, II et al. |
| 2023/0415024 A1 | 12/2023 | Kortschot |
| 2024/0010291 A1 | 1/2024 | Desberg et al. |
| 2024/0399920 A1 | 12/2024 | Desberg et al. |
| 2025/0010168 A1 | 1/2025 | Desberg et al. |

FOREIGN PATENT DOCUMENTS

| | | |
|---|---|---|
| CN | 2273210 Y | 1/1998 |
| CN | 2436196 Y | 6/2001 |
| CN | 2448414 Y | 9/2001 |
| CN | 2449767 Y | 9/2001 |
| CN | 2452873 Y | 10/2001 |
| CN | 1143702 C | 3/2004 |
| CN | 2619503 Y | 6/2004 |
| CN | 2717494 Y | 8/2005 |
| CN | 2785659 Y | 6/2006 |
| CN | 2915189 Y | 6/2007 |
| CN | 200966900 Y | 10/2007 |
| CN | 203486089 U | 3/2014 |
| CN | 204021174 U | 12/2014 |
| CN | 104787183 | 7/2015 |
| CN | 104941171 A | 9/2015 |
| CN | 105148496 A | 12/2015 |
| CN | 303684781 | 5/2016 |
| CN | 106422285 A | 2/2017 |
| CN | 205952205 | 2/2017 |
| CN | 205952219 U | 2/2017 |
| CN | 206138715 U | 5/2017 |
| CN | 108295457 A | 7/2018 |
| CN | 108325204 A | 7/2018 |
| CN | 304753393 | 7/2018 |
| CN | 109927829 | 6/2019 |
| CN | 305407387 | 10/2019 |
| CN | 110979533 A | 4/2020 |
| CN | 210258685 U | 4/2020 |
| CN | 210618344 U | 5/2020 |
| CN | 305886136 | 6/2020 |
| CN | 111703528 A | 9/2020 |
| DE | 4424297 A1 | 1/1996 |
| DE | 201 07 388 U1 | 7/2001 |
| EP | 0 995 468 | 4/2000 |
| EP | 3943373 A1 | 1/2022 |
| GB | 2 441 394 | 9/2008 |
| GB | 9007711890-0001 | 2/2020 |
| GB | 8210638000-1000 | 4/2020 |
| JP | 56085381 | 7/1981 |
| JP | H06-305476 A | 11/1994 |
| JP | 2001-225775 A | 8/2001 |
| JP | 3081197 U | 10/2001 |
| KR | 200378761 Y1 | 3/2005 |
| SU | 912584 A1 | 3/1982 |
| TW | M582478 U | 8/2019 |
| WO | WO 96/20762 | 7/1996 |
| WO | WO 2000/03773 | 1/2000 |
| WO | WO 2002/089933 | 11/2002 |
| WO | WO 2008/006275 | 1/2008 |
| WO | WO 2008/019482 | 2/2008 |
| WO | WO 2015/095368 | 6/2015 |
| WO | WO 2015/114614 A2 | 8/2015 |
| WO | WO 2016/128488 | 8/2016 |
| WO | WO 2017/050247 | 3/2017 |
| WO | WO 2018/013994 | 1/2018 |
| WO | WO 2018/019156 A1 | 2/2018 |
| WO | WO 2019/0232248 | 12/2019 |
| WO | WO 2020/069299 A1 | 4/2020 |
| WO | WO 2021/073422 A1 | 4/2021 |
| WO | WO 2022/032136 | 2/2022 |

OTHER PUBLICATIONS

Amy Tucker, "We tried both Calgary e-scooter brands Lime and Bird—here's how they compare," Jul. 30, 2019, the star.com, site visited Jan. 23, 2023, https://www.thestar.com/calgary/2019/07/29/we-tried-both-calgary-e-scooter-brands-lime-and-bird-heres-how-they-compare.html, in 3 pages.

Kids Roller Skates—Heel Wheel Roller Skates Attachable Shoe, https://www.amazon.ca/Kids-Roller-Skates-Attachable-Trainer/dp/B08R21VVDJ/, Dec. 19, 2020, in 1 page.

"Razor Electric Hub Motor Scooter Owner's Manual (Kobalt)," Aug. 12, 2020, data2.manualslib.com, site visited Jan. 23, 2023, https://data2.manualslib.com/pdf7/209/20836/20836/2083509-razor/kobalt.pdf?edd92ca8adaa31a5bed07f3ecd24e2e5, in 4 pages.

Razor Jetts Heel Wheels, Purple, One Size, https://www.amazon.ca/Razor-Jetts-Heel-wheels-purple/dp/B073XQJZSX/, Jul. 14, 2017, in 1 page.

"Razor Worldwide," Nov. 11, 2019, facebook.com, site visited Jan. 23, 2023, https://www.facebook.com/RazorWorldwide/photos/2558446474245901, in 1 page.

Tim Nelson and Elizabeth Dunbar, "Electric scooter rentals debut in Twin Cities; Mpls. Eyes regulation," Jul. 10, 2018, mprnews.org, site visited Jan. 23, 2023, https://www.mprnews.org/story/2018/07/10/electric-scooter-rentals-debut-twin-cities-hours-before-mpls-vote, in 1 page.

"Xiaomi M365/PRO/PRO2/1S/3 any voltage hot swappable extra battery," Jun. 8, 2020, youtube.com, site visited Jan. 23, 2023, https://www.youtube.com/watch?v=1cJFdFCtMGI, in 1 page.

"Zag Daily," Aug. 25, 2020, twitter.com, suite visited Jan. 23, 2023, https://mobile.twitter.com/ZagDaily/status/1298193918660694017/photo/1, in 1 page.

Office Action in corresponding Japanese Patent Application No. 2018-538211, dated Aug. 10, 2021, in 6 pages.

(56) References Cited

OTHER PUBLICATIONS

Office Action in corresponding Japanese Patent Application No. 2022-076172, dated Dec. 23, 2022, in 8 pages.
International Search Report in co-pending International Application No. PCT/US2017/013998, mailed May 25, 2017, in 4 pages.
International Preliminary Report on Patentability in co-pending International Application No. PCT/US2017/013998, issued Jul. 24, 2018, in 10 pages.
Extended European Search Report in corresponding European Patent Application No. 17741870.4, dated Jul. 25, 2019, in 13 pages.

* cited by examiner

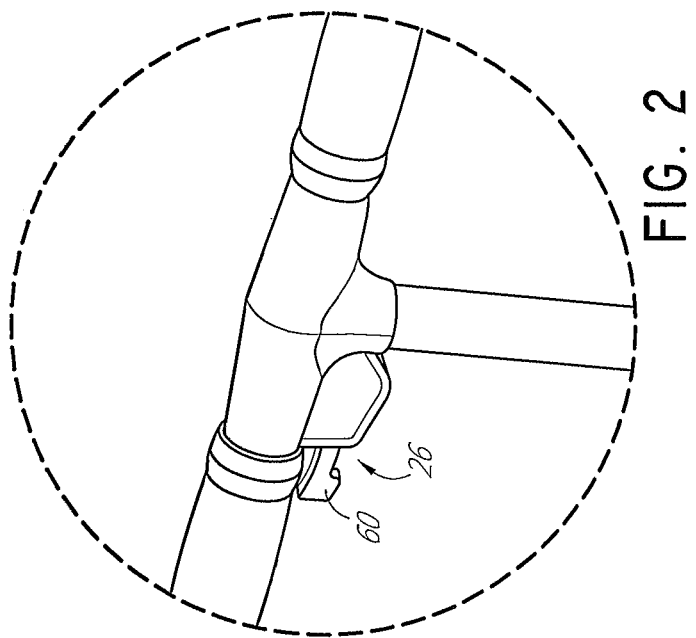
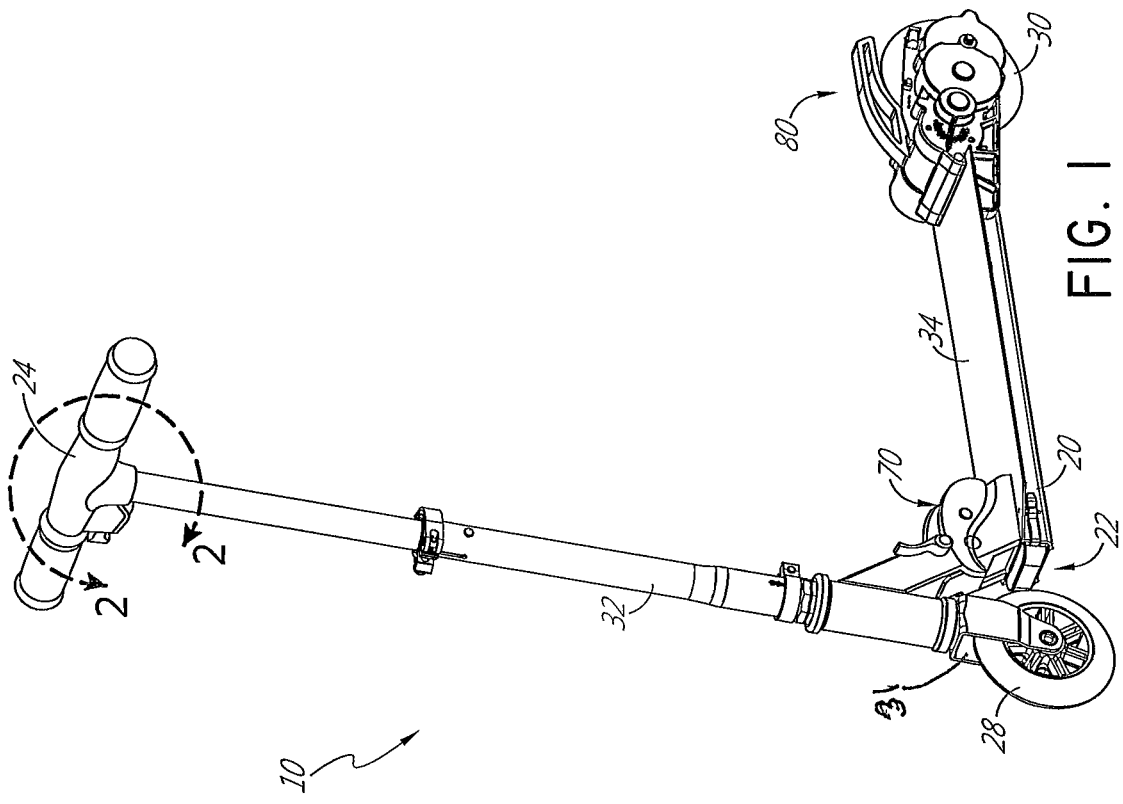

ELECTRIC SCOOTER

CROSS REFERENCE

This application is a continuation of U.S. patent application Ser. No. 16/263,801, filed Jan. 31, 2019, now U.S. Pat. No. 11,975,794, which is a continuation of U.S. patent application Ser. No. 15/409,488, filed Jan. 18, 2017, which claims the priority benefit under at least 35 U.S.C. § 119 of U.S. Patent Application No. 62/286,124, filed Jan. 22, 2016, and U.S. Patent Application No. 62/340,978, filed May 24, 2016, and which is a continuation in part of U.S. patent application Ser. No. 29/577,038, filed Sep. 8, 2016, now Pat. No. D818,541. The entirety of each of the aforementioned applications is incorporated by reference herein.

BACKGROUND

Field

Embodiments of the disclosure relate generally to personal mobility vehicles, such as electric scooters that can freewheel in at least one direction.

Description of Certain Related Art

The use of personal mobility vehicles, such as scooters, has become a popular recreational activity as well as useful means of personal transportation. Scooters have become popular among many age groups and there are many different scooter variations and scooter designs. Conventional scooters have at least two wheels and a steering mechanism. Scooter designs have become more compact and convenient, and some scooters have folding mechanisms allowing the user to easily store or carry the scooter. In order to allow a user to slow or stop a scooter, some scooters include a braking mechanism.

SUMMARY OF CERTAIN FEATURES

With the increased popularity of scooters, variations of the conventional scooters have gained popularity as well, including motorized scooters. With the use of electric or motorized scooters, the weight of an electric motor may limit the portability of the scooter, particularly for commuters. Additionally, use of large electric motors can require large batteries, further increasing the weight of the scooter. Thus there is a need to provide an electric scooter having a small motor and battery to allow for a lightweight and portable electric scooter at a low cost.

Some electric powered scooter embodiments include an electric motor mounted to the front or rear of the scooter frame near at least one of the front or rear wheels, with a drive assembly coupled to the motor and configured to transfer drive power from the motor to the driven front or rear wheel. The drive assembly can include powered rollers using frictional directional force upon the circumference of the driven wheel or a drive chain linking the drive means to the hub of the driven wheel. The driven wheel can be electrically driven when a throttle assembly controlling the motor, commonly located on or about the handlebar, is activated by the user. Some electric powered scooter embodiments include a battery compartment accessible when the scooter is a folded configuration.

Scooters having a driven wheel that is not able to freewheel in one direction can have several disadvantages, such as unwanted noise, undesirable friction, and/or difficulty moving or transporting the scooter due to the wheel being unable to move unless powered. Certain of the electric powered scooter embodiments disclosed herein address these issues, or other issues, by allowing the driven wheel to freewheel in at least one direction so that the scooter may be moved when unpowered.

BRIEF DESCRIPTION OF THE DRAWINGS

These and other features, aspects, and advantages are described below with reference to drawings of an example embodiment, which are intended to illustrate, but not to limit, the present disclosure.

FIG. 1 is a perspective view of an embodiment of a scooter.

FIG. 2 is a close up view of a wireless remote throttle that may be used with the scooter of FIG. 1.

DETAILED DESCRIPTION OF CERTAIN EMBODIMENTS

Figure 4:
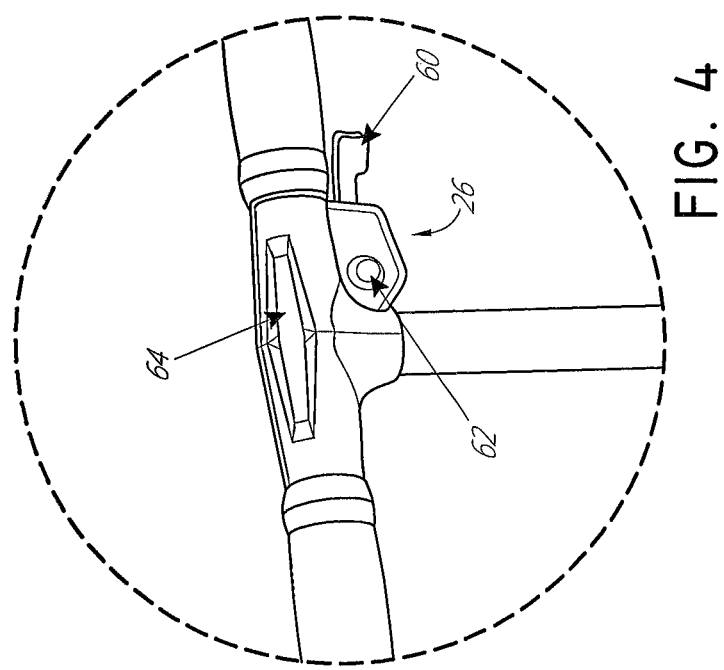
FIG. 4 is a close up view of a display and throttle arrangement of the scooter of FIG. 1.

Reference will now be made in detail to various embodiments of the present technology, which relates to various personal mobility devices, such as scooters. Although certain specific embodiments of the present technology are described, the present technology is not limited to these embodiments. On the contrary, these described embodiments are merely illustrative of the present technology, and the present technology is intended to also cover alternatives, modifications, and equivalents. Furthermore, in the following detailed description, numerous specific details are set forth in order to provide a thorough understanding of the present technology. However, it will be recognized by one of ordinary skill in the art that embodiments may be practiced without these specific details. In some instances, well known methods, procedures, compounds, compositions and mechanisms have not been described in detail as not to unnecessarily obscure aspects of embodiments of the present technology.

FIGS. 1-14

FIGS. 1-14 illustrate an embodiment of an electric scooter 10. As shown in FIG. 1, the scooter 10 includes a scooter body 20, a support surface 34, a rotatable shaft 32, and a handlebar assembly 24. The support surface 34 can be configured to support at least one foot of the user. The illustrated support surface 34 is configured to accommodate both feet of a user, such as in one or both of a fore-and-aft or side-by-side arrangement. The scooter 10 includes at least one front wheel 28 and at least one rear wheel 30 connected with the scooter body 20. The front wheel 28 and the rear wheel 30 can be spaced apart from one another with the support surface 34 extending therebetween. The wheels 28, 30 can be aligned in the same plane, as depicted, and located at opposite ends of the support surface 34. As depicted, some embodiments of the scooter 10 include a rotatable shaft 32 which rotates with the handlebar assembly 24 so that the handlebar assembly 24 can rotate or swivel within a head tube of the scooter body 20. The shaft 32 can be connected with a fork 31 that connects with the front wheel 28, such that the handlebar assembly 24 can be rotated to swivel the front wheel 28 to steer the scooter 10. The fork 31 can be directly connected to sides of the front wheel 28 and/or an axle that extends through a rotational axis of the front wheel 28.

In some embodiments, the scooter 10 includes a folding assembly 70 and/or a motor assembly, such as a rear drive assembly 80. The folding assembly 70 allows the handlebar assembly 24 and the rotatable shaft 32 to pivot relative to the body 20 such that the handlebar assembly 24 folds against the body 20 for compact transport and storage of the scooter 10. Accordingly, in some embodiments, the rotatable shaft 32 can pivot about the folding assembly 70.

The rear drive assembly 80 can include a motor 93 (see FIG. 6) to drive the rear wheel 30. In certain embodiments, torque from the motor 93 is transmitted to the wheel 30 via a transmission, such as a gear set or gear assembly. The folding assembly 70 and the rear drive assembly 80 are discussed in greater detail below.

As shown in FIG. 2, in some embodiments, the handlebar assembly 24 includes a control mechanism, such as a wireless throttle remote assembly 26. The wireless throttle remote assembly 26 includes a throttle 60 that can be toggled by the user to increase or decrease the speed of a motor 93 to increase or decrease the speed of the scooter. In some embodiments, the throttle assembly 26 is wireless; however, in other embodiments, the throttle assembly 26 is wired to a motor 93 and/or a battery. In some embodiments, the throttle assembly 26 may include a brake lever (not shown) to activate a braking assembly to slow or stop the scooter 10. The throttle assembly 26 can be connected to the braking assembly through a wireless and/or mechanical connection. In some embodiments, the throttle 60 comprises a button, switch, lever, or other actuator available to the hand of the user while the user operates the scooter 10. Depressing the button throttle 60 initiates a signal (e.g., an electric or RF signal) to a controller, which signals for power to be transferred from the battery to the electric motor 93, resulting in rotational power being transferred from the electric motor 93 to the at least one driven wheel. In certain embodiments, the user is able to engage the throttle by a hand crank throttle mechanism mounted on the handlebar assembly. In some embodiments, the user is able to engage the throttle by a hand lever mechanism, or other similar hand actuated mechanisms.

Figure 3:
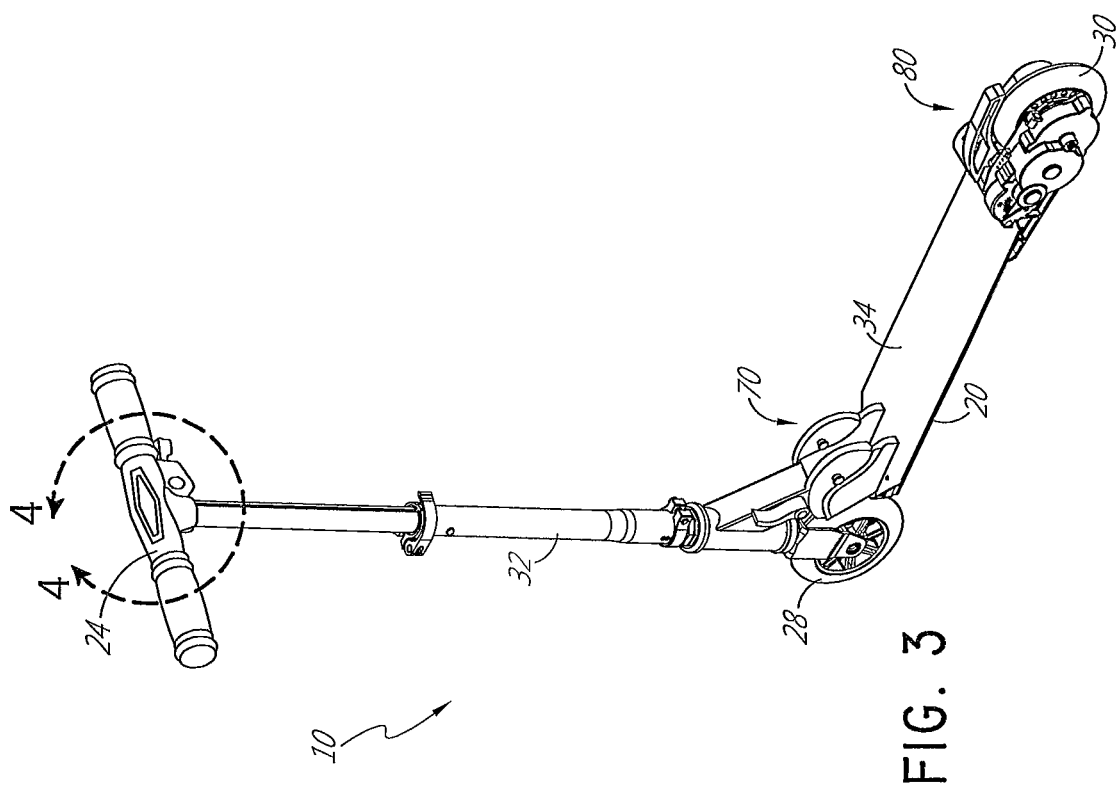
FIG. 3 is a rear perspective view of the scooter of FIG. 1.

With reference to FIGS. 3 and 4, in some embodiments, the throttle assembly 26 includes an on/off switch or button 62 and/or a display 64. The on/off switch 62 may be used to send a "power on" or "power off" signal to the battery and/or the motor 93. The display 64 provides a visual indication of a characteristic of the scooter, such as battery level, speed, distance, direction, or other information. In some embodiments, the display 64 indicates the amount of battery power remaining. The display 64 may indicate the battery power as a digital percentage display, or as a color gradient (such as green, yellow, red), or with any other visual indicator. The display 64 may be configured to indicate when the battery should be replaced and/or recharged, or the amount of time remaining until the battery is fully discharged.

Figure 5:
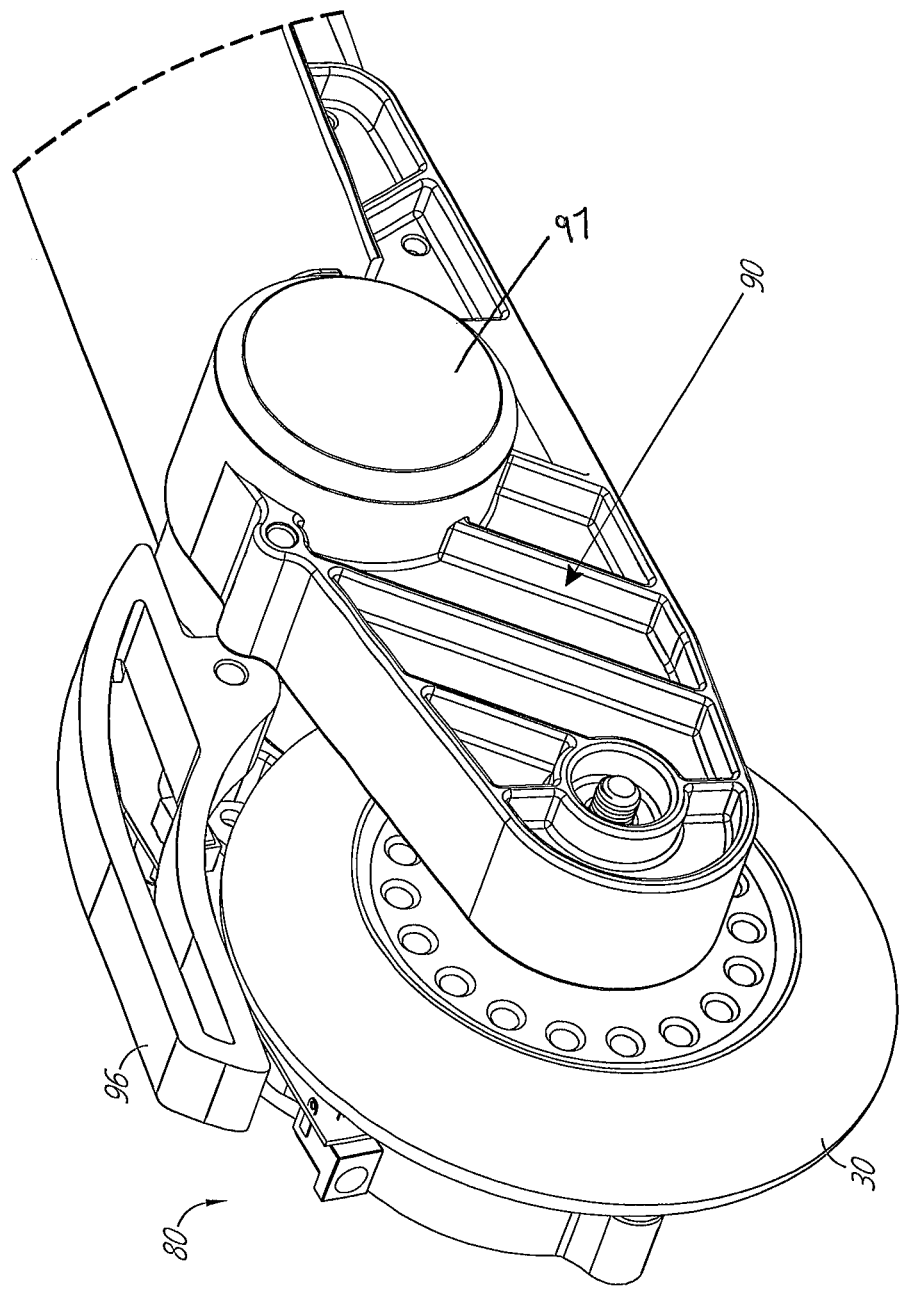
FIG. 5 is a close up rear perspective view of a first side of the rear wheel assembly of the scooter of FIG. 1.

FIG. 5 illustrates a close-up view of the rear wheel 30 and rear drive assembly 80 of the scooter 10. A side piece 90 is removable to provide access to the rear wheel 30 in case the rear wheel should need repair or replacement, such as due to wear, etc. A side piece 90 can be connected to the rear drive assembly 80 to surround at least a portion of the rear drive assembly 80. For example, as shown, the side piece 90 can include one or more contour features, such as ribs or fins. The side piece 90 can be connected to the rear drive assembly by a mechanical fastener and/or a snap-fit configuration. As also shown, the motor 93 can be contained in a protective shell, such as a generally cylindrical casing 97. In some embodiments, the side piece 90 and the casing 97 form a unitary and/or integral unit. In other embodiments, the cylindrical casing 97 is separate from the side piece 90.

Figure 6:
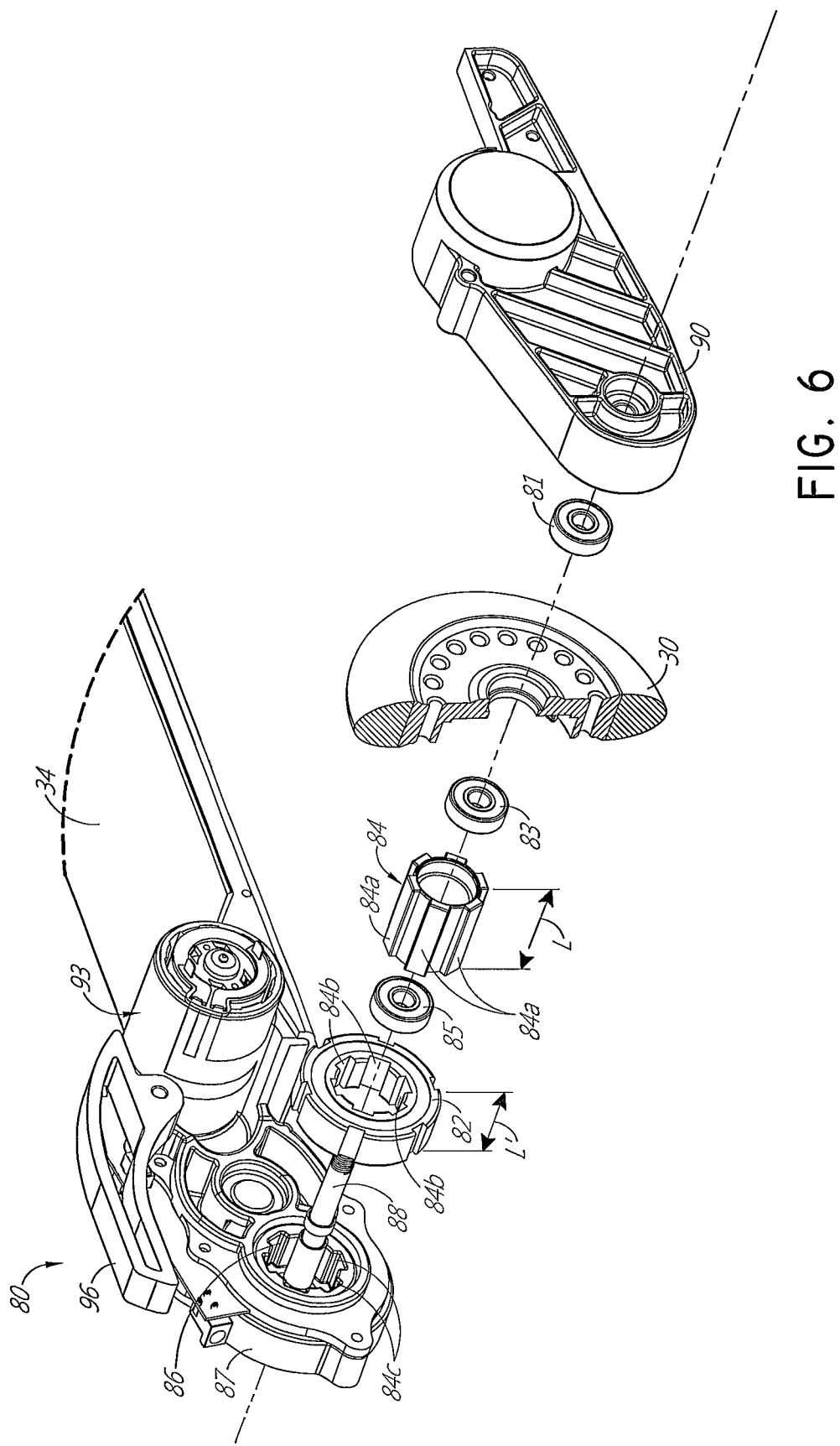
FIG. 6 is a partial exploded view of the rear wheel assembly of the scooter of FIG. 1.

A close-up partial exploded view of the rear drive assembly 80 is illustrated in FIG. 6. The side piece 90 is removed to illustrate how various components connect together to provide power to rear wheel 30. In some embodiments, the rear drive assembly 80 includes a gear 84 that connects to (e.g., is received in) a rotation connector 82. The gear 84 and connector 82 are received (e.g., wedged) within the rear wheel 30. In some configurations, this can provide a friction fit to secure the gear 84 and connector 82 within the rear wheel 30.

In some embodiments, the rotation connector 82 comprises a one-way bearing connector. The one-way bearing connector 82 can be configured to transmit torque in one direction and allow free motion in the opposite direction. In certain implementations, the one-way bearing connector 82 allows the wheel 30 to spin freely (also called "freewheeling") in a one rotational direction and can be driven in an opposite rotational direction. For example, relative to the orientation of the scooter 10, the one-way bearing connector 82 can enable the wheel 30 to freewheel when the scooter 10 is moved backward and to be driven to move the scooter 10 forward. In some embodiments, the wheel 30 is configured to rotate about a wheel axis 88 and/or to be driven by the motor 93, such as through gearing. In some implementations, the one-way bearing 84 reduces or eliminates undesirable noises, such as clicking noises commonly heard with bearings, by allowing the rear wheel 30 to freewheel. The one-way bearing connector 82 fits within a connector receiving area 86 of a gear box housing 87. The gear box housing 87 can house and/or surround at least one or more components of the rear drive assembly 80. In some embodiments, the rear box housing 87 can connect directly and/or indirectly to the side piece 90 to surround at least a portion of the rear drive assembly 80. The rear drive assembly 80 can include a plurality of bearings 81, 83, and 85.

In some embodiments, the rear drive assembly 80 includes a brake mechanism 96. The brake mechanism 96 may be in the form of a lever, as shown in FIG. 6, which can be activated by a user's foot to apply pressure to the rear wheel 30 and result in a braking force due to friction between the rear wheel 30 and the brake mechanism 96. The brake mechanism 96 may be formed integrally with the main structure of the rear deck or body of the scooter 10 or may be a separate component coupled with the main structure of the rear deck or body of the scooter 10. In some embodiments, the brake mechanism 96 is similar or identical to the brake assembly disclosed in U.S. Pat. No. 8,813,892, which is hereby incorporated by reference in its entirety. In some embodiments, the brake mechanism 96 comprises a rear end that is configured to engage with the rear wheel 30 and/or a front end that is configured to engage with the casing 97. The brake mechanism 96 can be biased by a biasing member, such as a spring. For example, the rear end of the brake mechanism 96 can be biased away from the rear wheel 30 and/or the front end of the brake mechanism 96 can be biased into engagement with a stop structure, such as the casing 97. As shown in FIG. 1, for example, the brake mechanism 96 can extend rearwardly from the main structure of the rear deck or body of the scooter 10 and can extend over at least a portion of the rear wheel 30.

Figure 7:
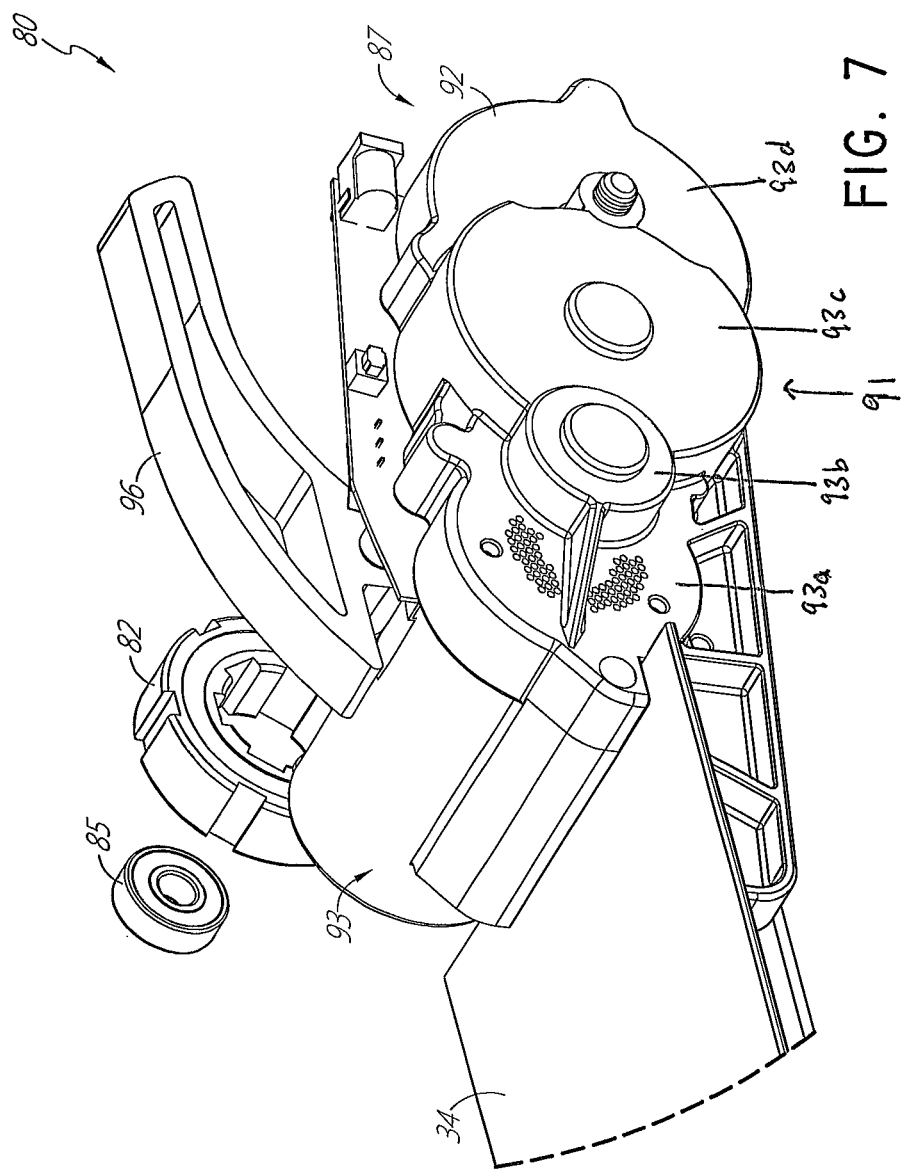
FIG. 7 is a close up rear perspective view of a second side of the rear wheel assembly of the scooter of FIG. 1.
Figure 8:
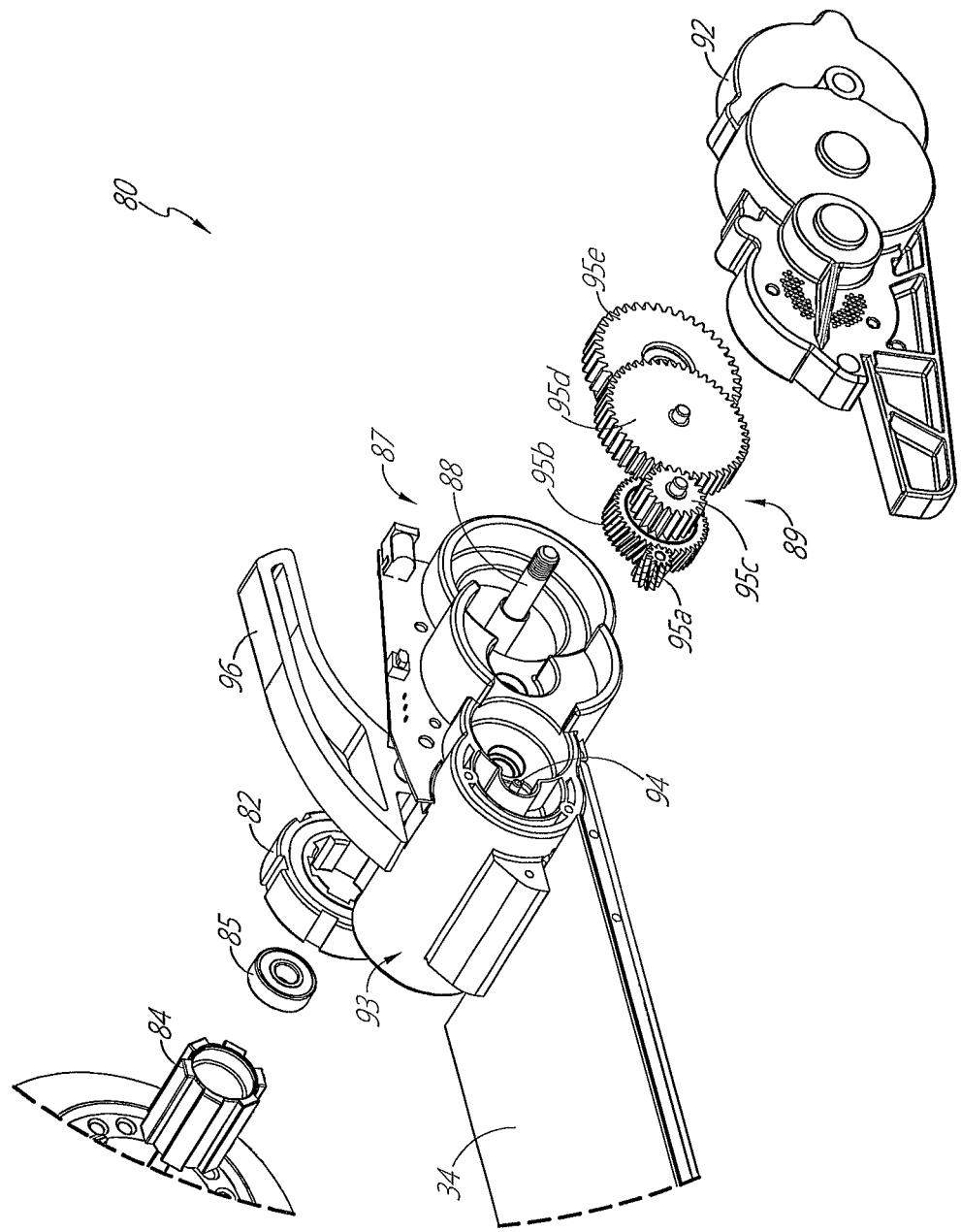
FIG. 8 is a close up exploded view of the rear wheel assembly of the scooter of FIG. 1.

FIG. 7 illustrates a view of the opposite or gear box side of the rear drive assembly 80 and FIG. 8 illustrates an exploded view of the side of the rear drive assembly 80 shown in FIG. 7. A gear set 89 is housed within the gear box housing 87. The gear box housing 87 may be part of the main structure of the rear deck or body of the scooter 10. A portion of the gear set 89 can be enclosed on the outside with a gear box side piece 92 and a cover piece 91. The side piece 92 can include one or more apertures, such as to allow airflow from ambient to the motor 93 for cooling. As shown, in some embodiments, the side piece comprises a stepped configuration, such as a first step 93a, a second step 93b, a third step 93c, and a fourth step 93d. Each of the steps can have a circular peripheral shape. In some embodiments, as illustrated, the first, second, and third steps 93a-93c can have respective outer surfaces that are laterally offset (e.g., non-coplanar) from each other. In some implementations, the outer surfaces of the first and fourth steps 93a, 93d are substantially co-planar. In some embodiments, the second step 93b includes at least one fin that extends forwardly from the second step 93b to the first step 93a. The gear set 89 can include a plurality of gears (e.g., a worm gear, spur gear, etc.) that can be used to convert the torque produced by the motor 93 into a torque that is used to power the rear wheel 30. The motor 93 may be housed within the gear box 87 at or near the end of the deck or body of the scooter 10. As illustrated, the gear box 87, in some configurations, forms a part of the structure of the rear deck or tail of the scooter 10. In some embodiments, the motor 93 may be a hub motor similar to those described in U.S. Patent Publication No. 2015/0133253, which is incorporated by reference herein in its entirety. In certain embodiments, the motor 93 may be a small toy motor, such as those used to drive electric motor-driven toys.

Figure 9:
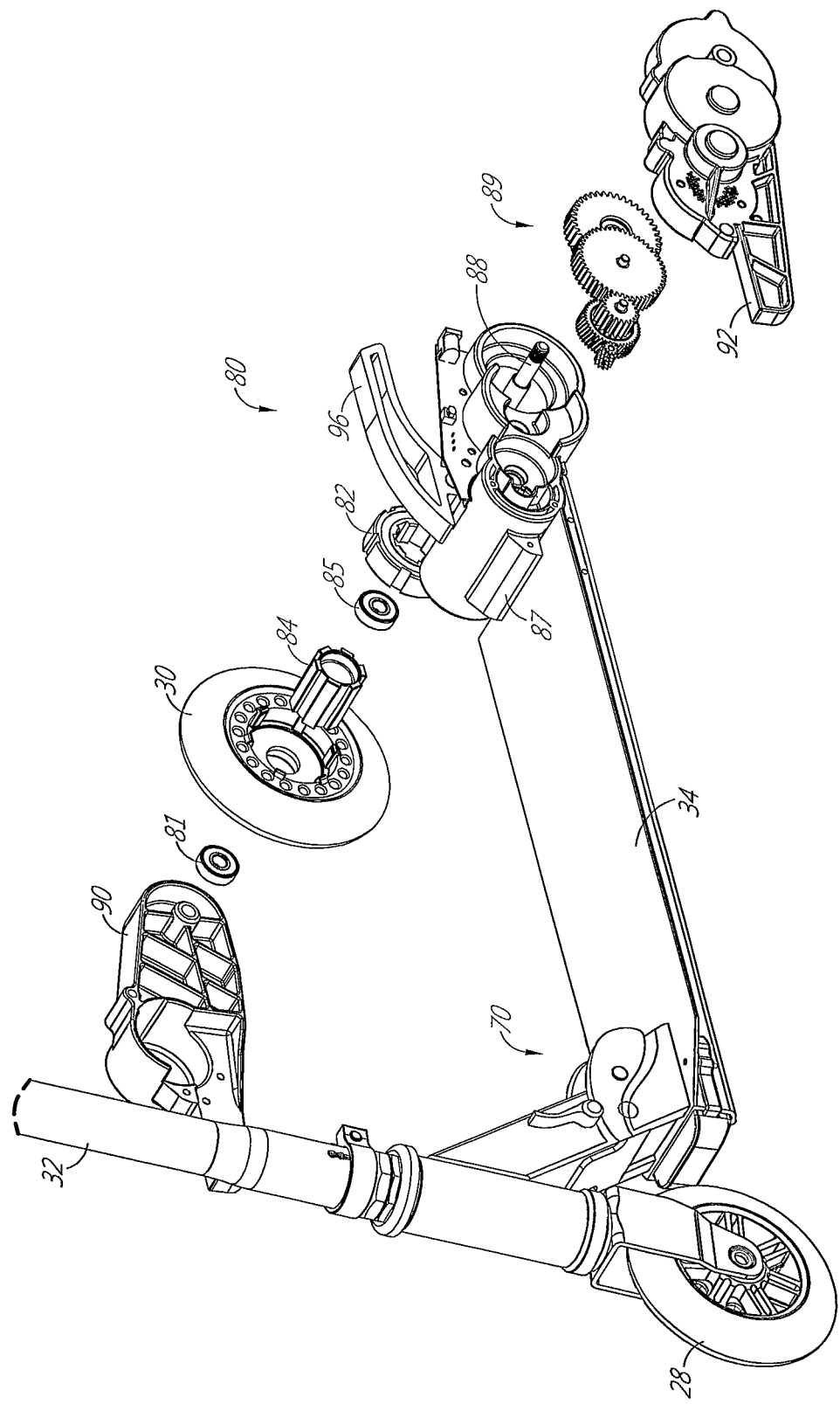
FIG. 9 is another exploded view of the rear wheel assembly of the scooter of FIG. 1.
Figure 10:
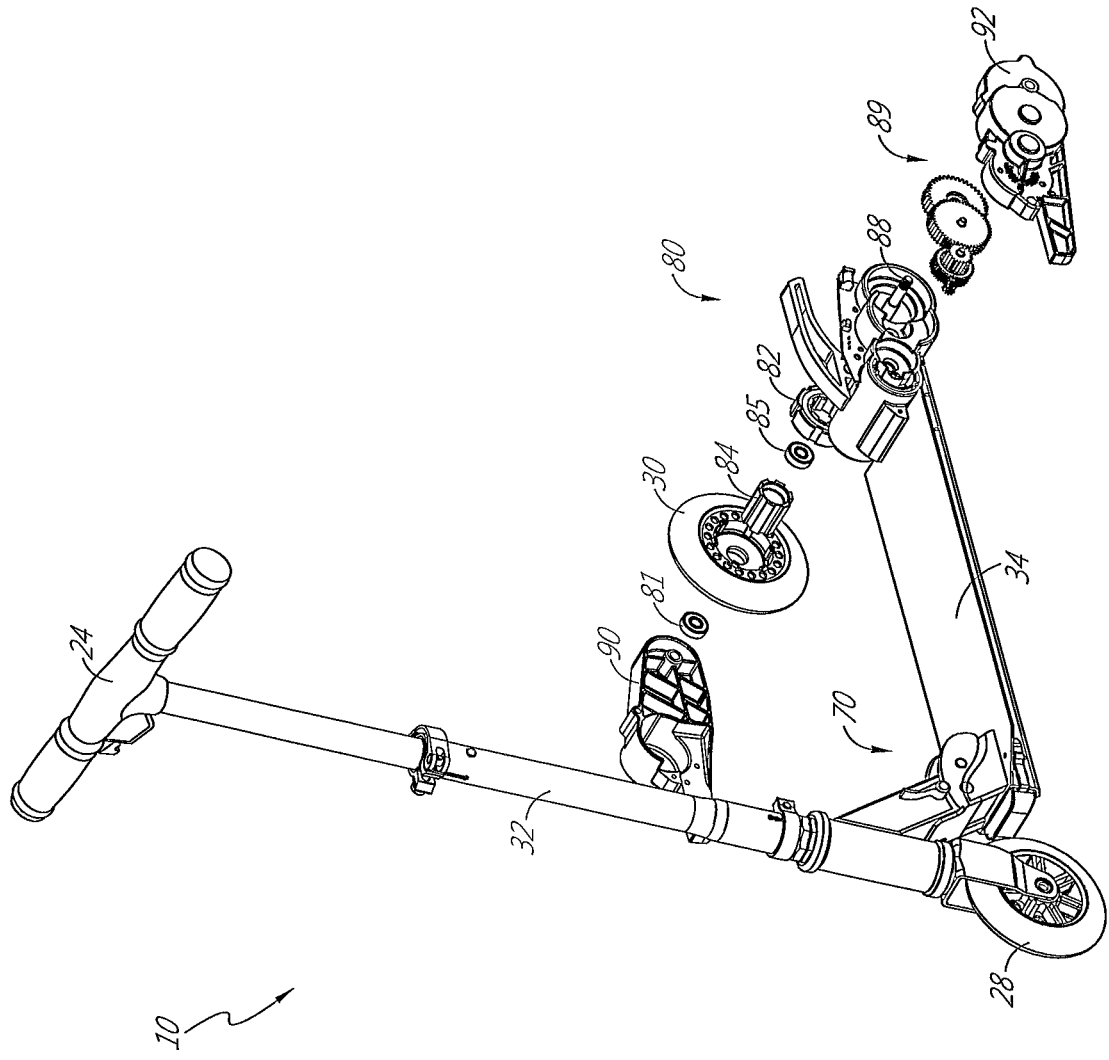
FIG. 10 is another exploded view of the rear wheel assembly of the scooter of FIG. 1.

As shown in FIGS. 8-10, the motor 93 drives a motor shaft 94, such as a driving shaft. In the embodiment illustrated, a gear 95a of the gear set 89 is mounted on the shaft 94 and a gear 95e of the gear set 89 is mounted on the rear wheel axis 88. The gears 95a, 95e can be operably connected through intermediate gears, such as gears 95b, 95c, 95d. Through the sequence of gears 95a-95e, the torque of the motor 93 is reduced to drive the rear wheel via the rear wheel axis 88. As discussed above, the gear 84 and bearing connector 82 allow the rear wheel 30 to be powered in a first, or forward direction, and allow the rear wheel 30 to freewheel in a second, or rearward direction. An exploded view of the rear drive assembly 80 is illustrated in FIGS. 9 and 10. In various embodiments, the rear wheel 30 can freewheel with no or substantially no sound (e.g., clicking) that is detectable by a user in normal operation of the scooter. For example, in some embodiments, during freewheeling, the wheel 30 and/or the connector 82 emits a sound that is less than or equal to about 20 decibels.

In some embodiments, the gear 84 has a diameter that is wide enough to be received within a receiving area of the bearing connector 82 and within the receiving area 86 of the gear box housing 87, as can be seen in at least FIG. 6. The gear 84 has a plurality of flanges 84a extending radially outward from the outer surface of the gear 84. The flanges 84a are configured to fit within corresponding recesses 84b located on the inside surface of the bearing connector 82. Similarly, the inside surface of the receiving area 86 of the gear box housing has recesses 84c that are also configured to receive the flanges 84a. The length L of the gear 84 is larger than the length L' of the bearing connector 82 such that at least a portion of the gear 84 is received within the bearing connector 82 and at least a portion of the gear 84 is received within the receiving area 86 of the gear box housing 87.

Rotation of the rear wheel axis 88 acts on the bearings 83, 85, which may be press fit or otherwise coupled to the axis 88. The bearings 83, 85 can be coupled with the gear 84 through a friction fit or other coupling mechanism such that rotation of the axis 88 also rotates the gear 84. Rotation of the gear 84 in a first rotational direction induces rotation of the bearing connector 82 through the interaction of the flanges 84a on the recesses 84b and rotates the rear wheel 30 in the first rotational or driven direction. As discussed above, the bearing connector 82 also permits freewheel rotation of the rear wheel 30 in a second rotational direction opposite the first rotational direction when the motor 93 is not powering the rear wheel 30 through the rear drive assembly 80, as discussed above.

Figure 11:
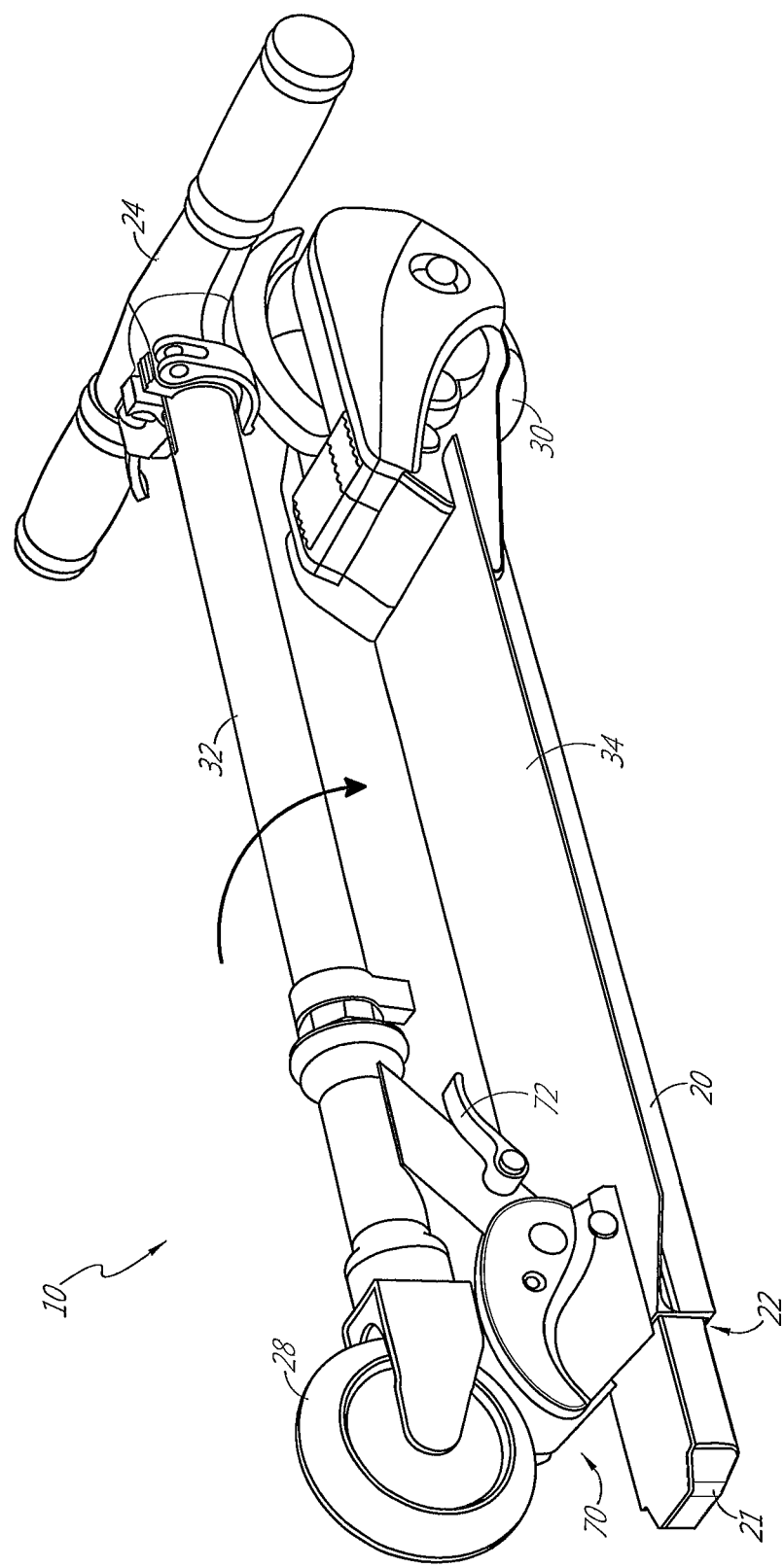
FIG. 11 is a perspective view of the scooter of FIG. 1 in a folded configuration.
Figure 12:
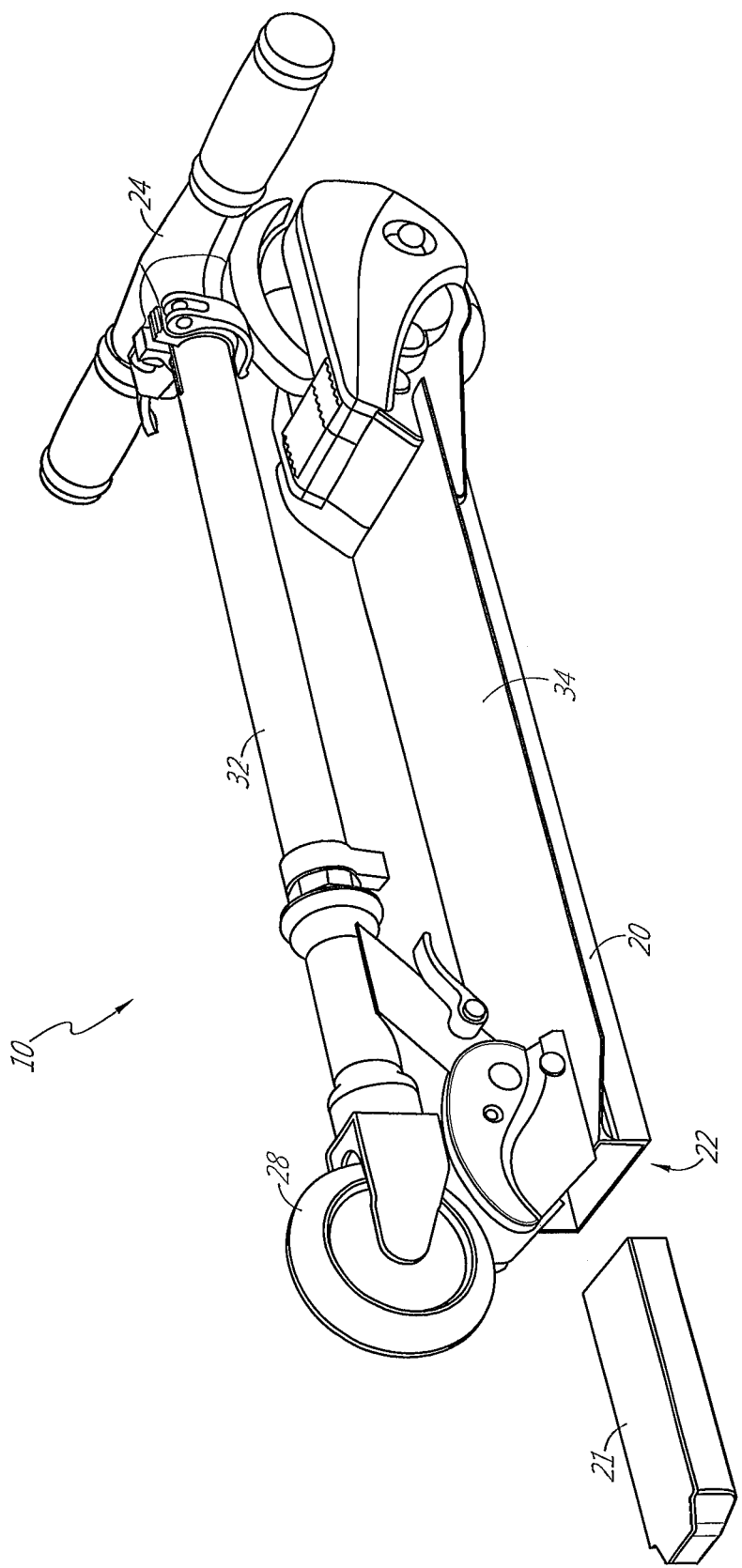
FIG. 12 is a perspective view of the scooter of FIG. 11 with a battery pack removed.
Figure 13:
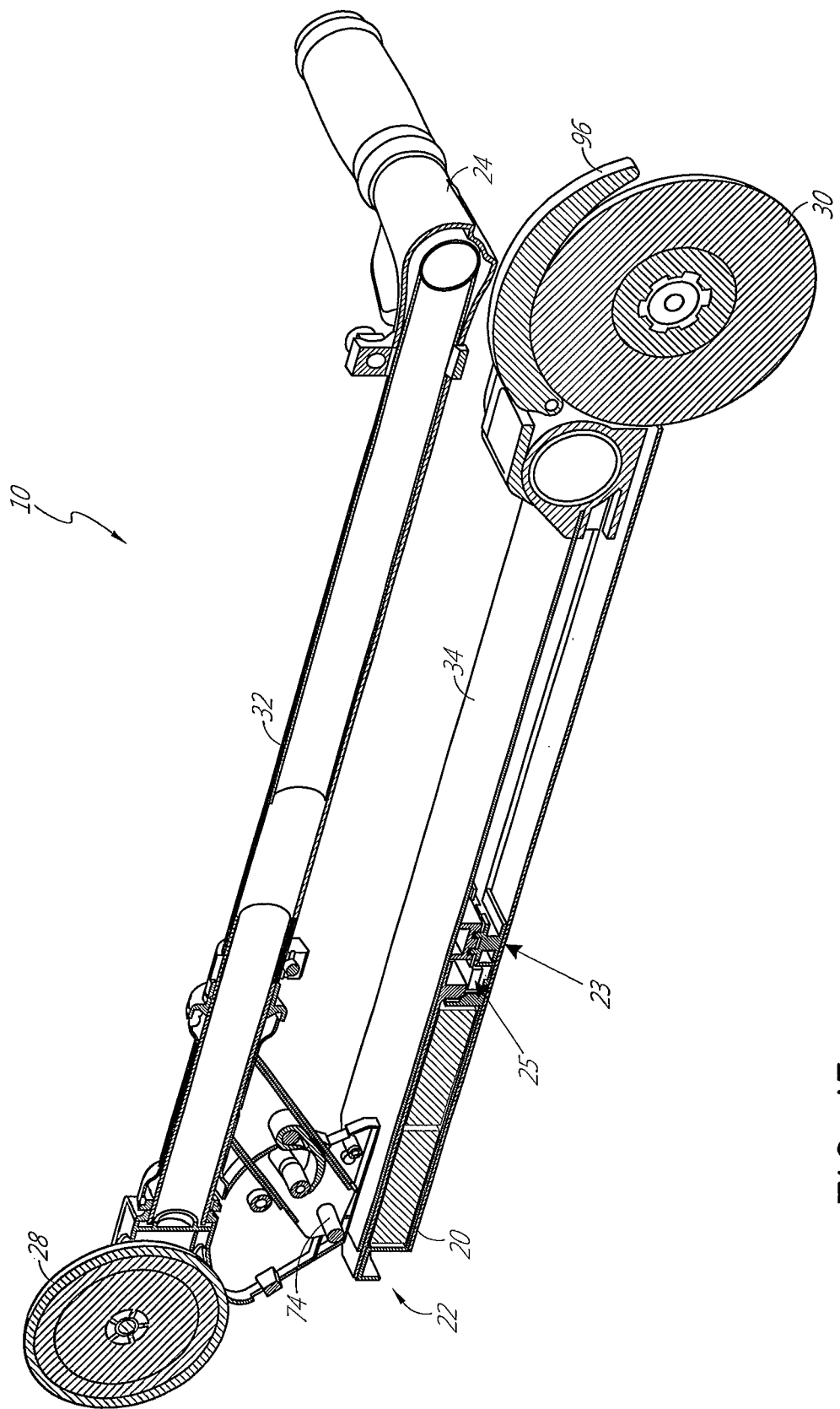
FIG. 13 is a partial cross-sectional view of the scooter of FIG. 11.
Figure 14:
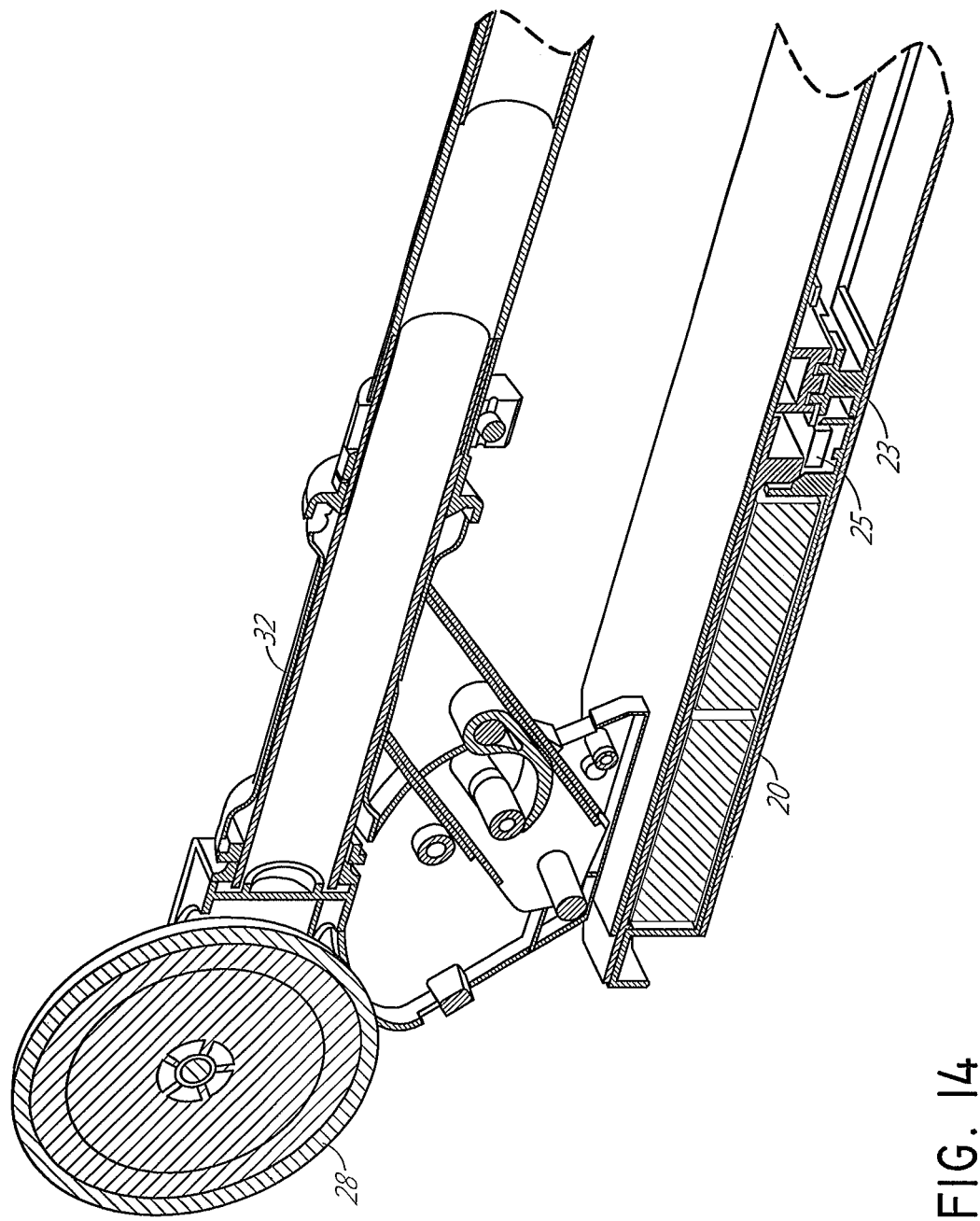
FIG. 14 is a close up view of the cross-sectional view of FIG. 13.
Figure 15:
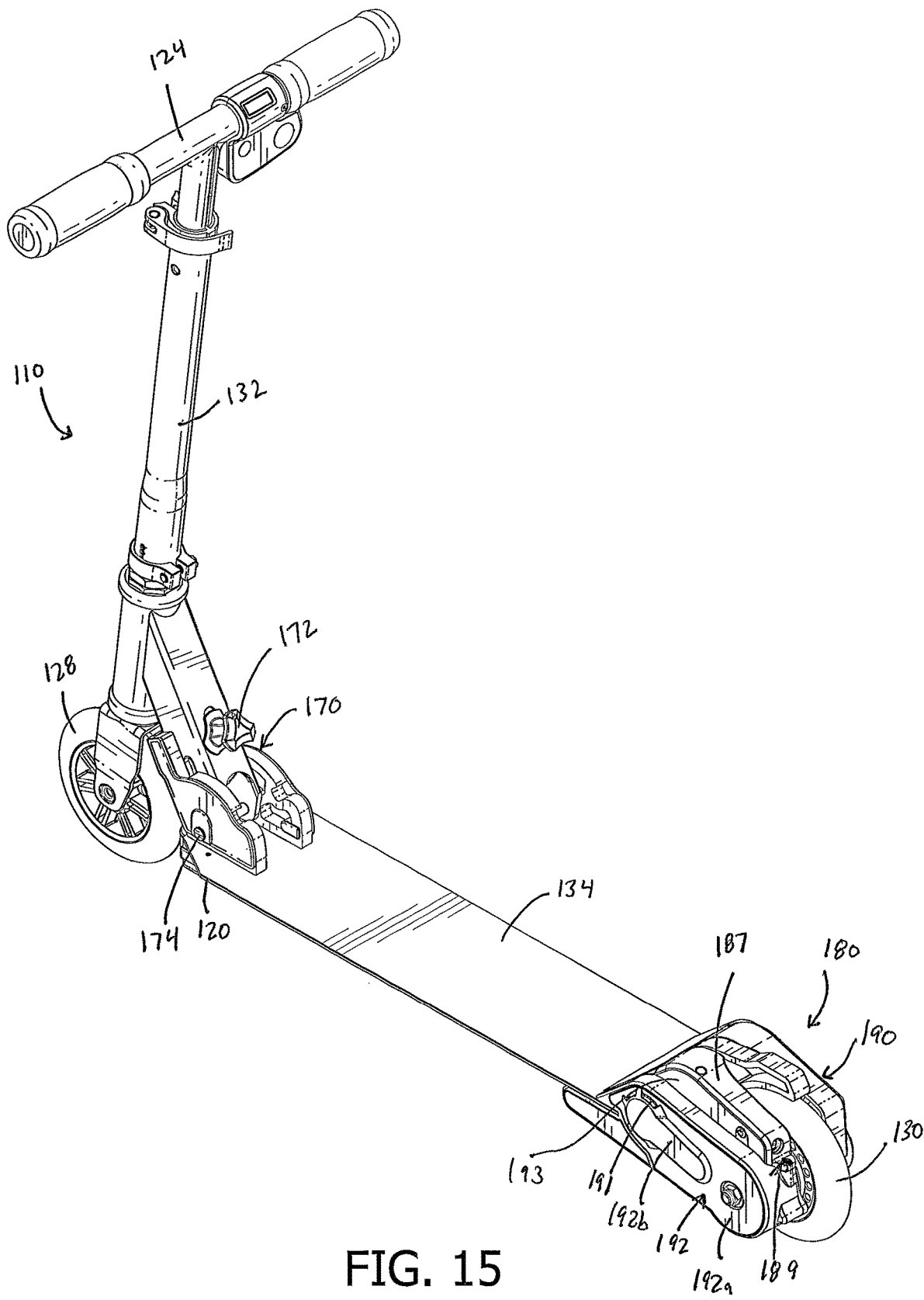
FIG. 15 is a perspective view of another embodiment of a scooter.
Figure 16:
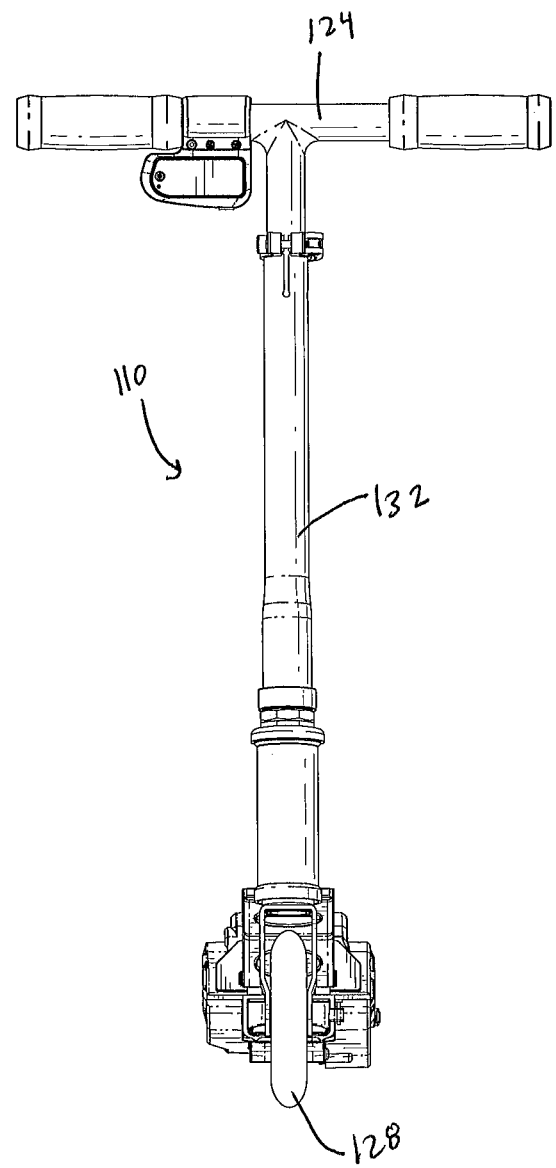
FIG. 16 is a front view of the scooter of FIG. 15.
Figure 17:
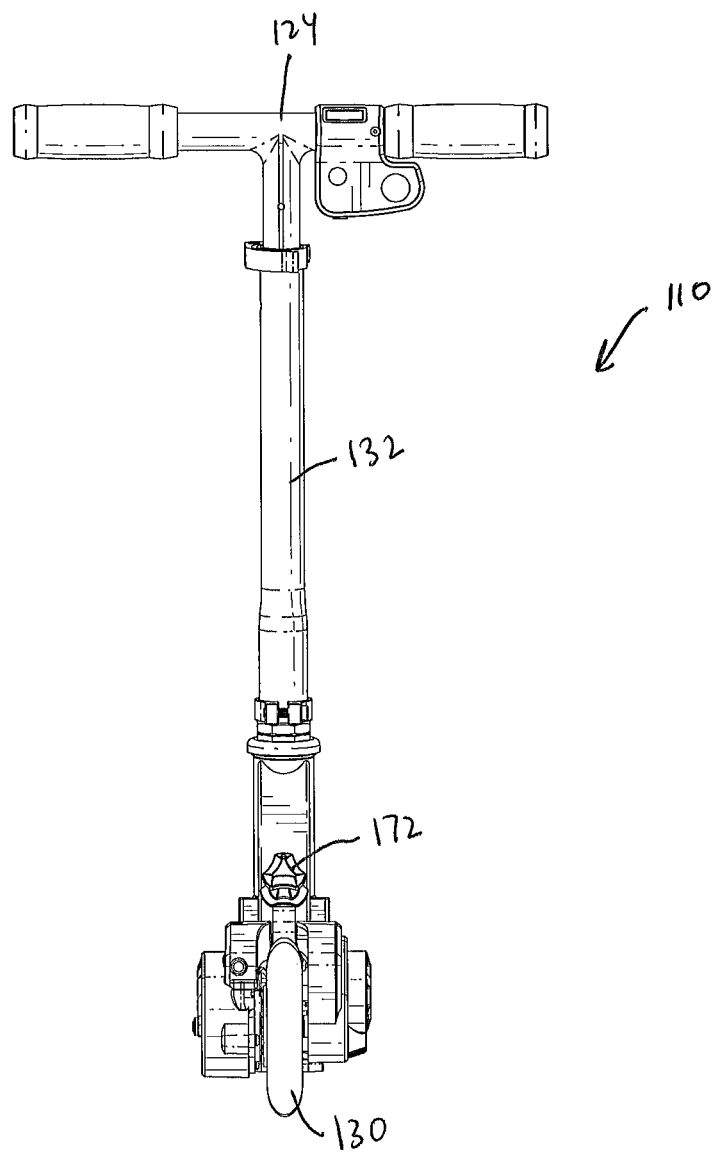
FIG. 17 is a rear view of the scooter of FIG. 15.
Figure 18:
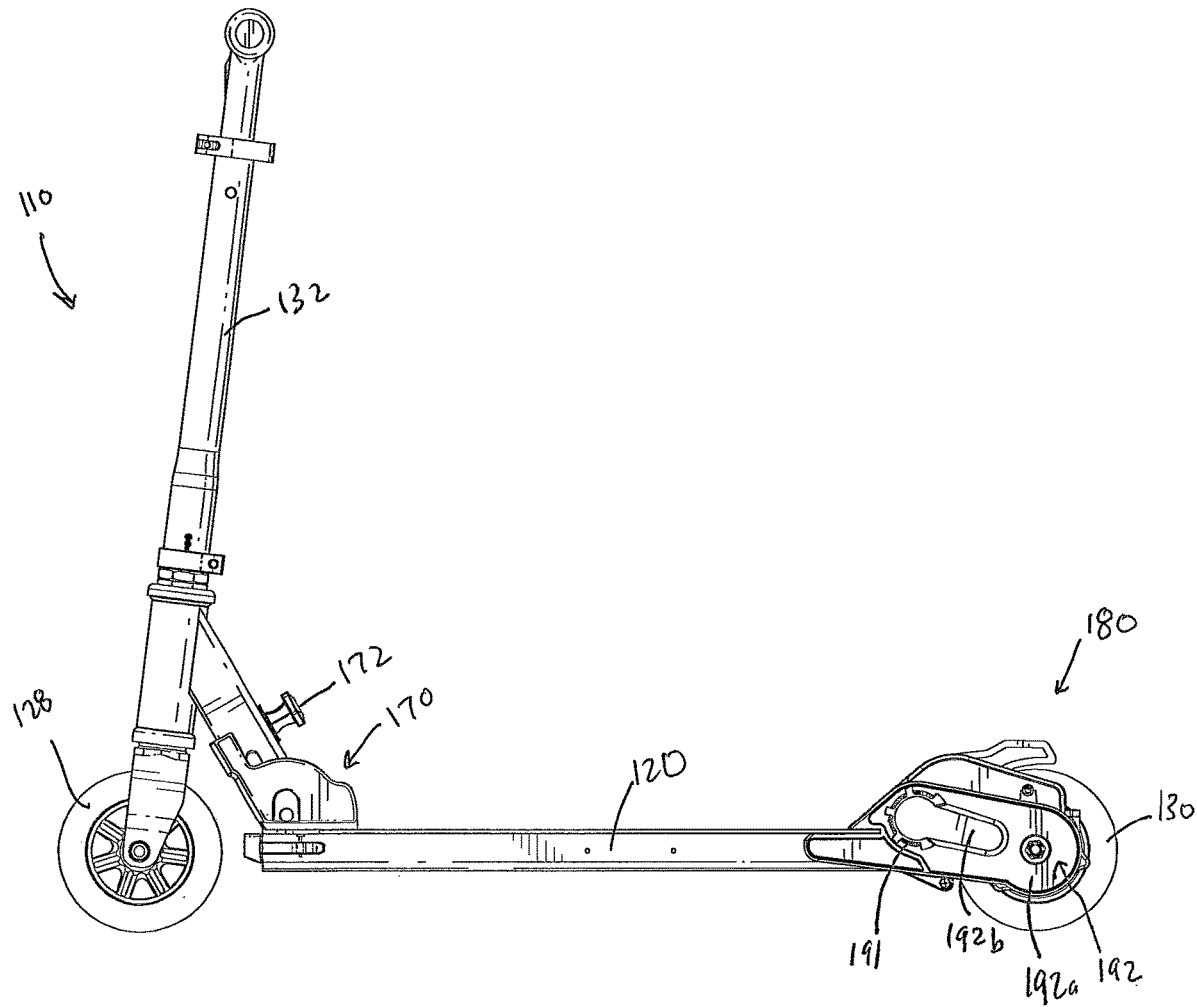
FIG. 18 is a left-side view of the scooter of FIG. 15.
Figure 19:
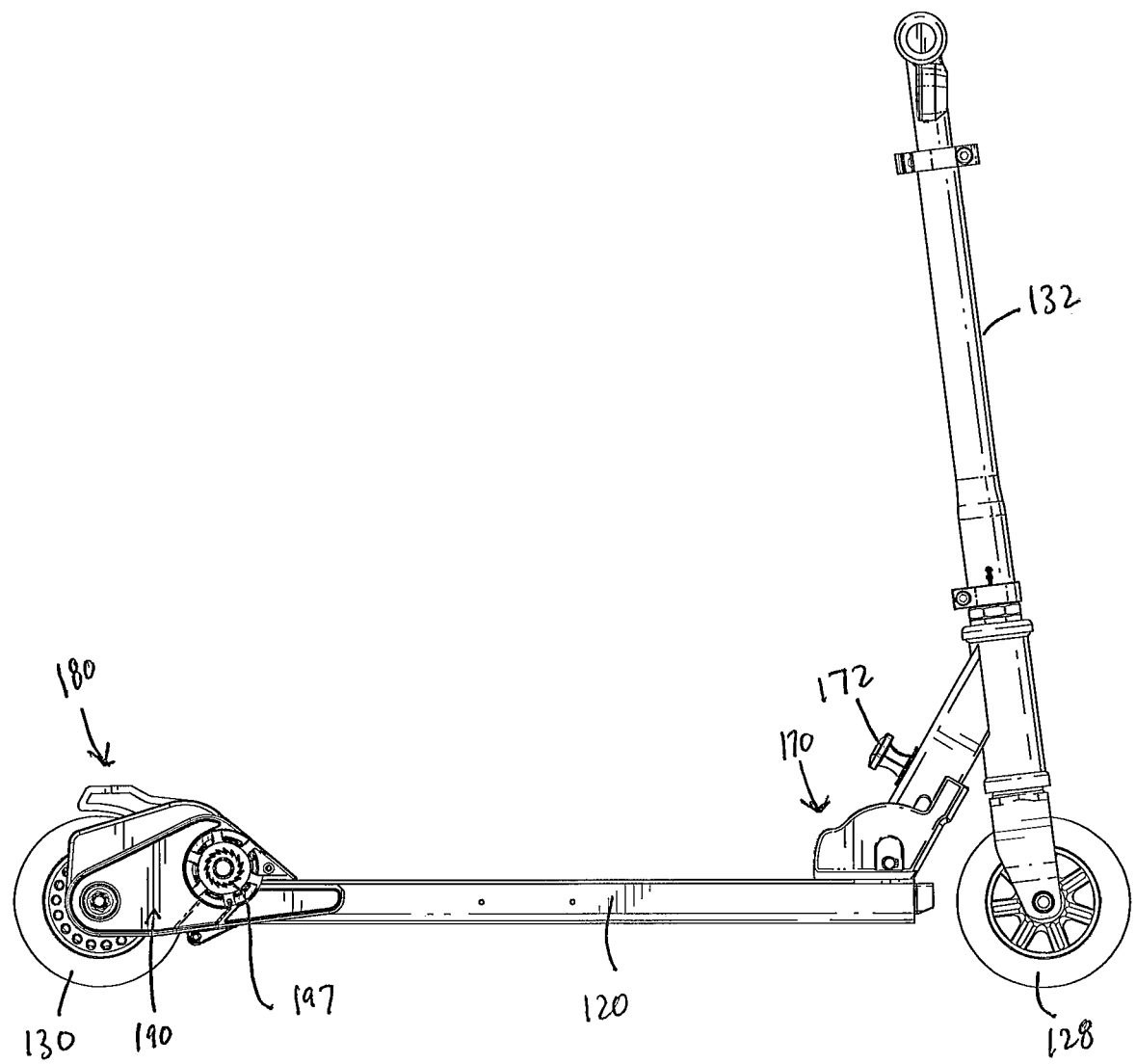
FIG. 19 is a right-side view of the scooter of FIG. 15.
Figure 20:
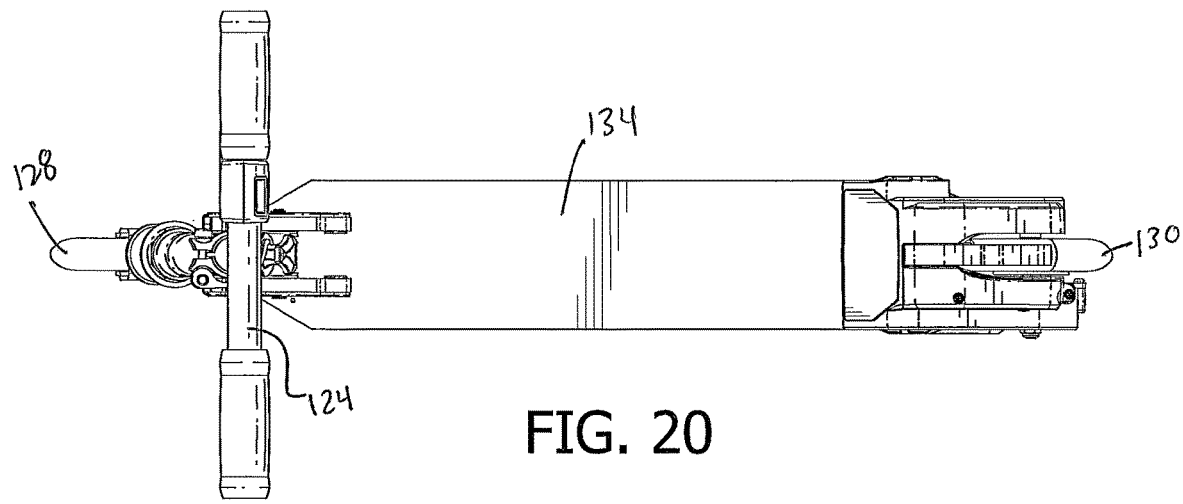
FIG. 20 is a top view of the scooter of FIG. 15.
Figure 21:
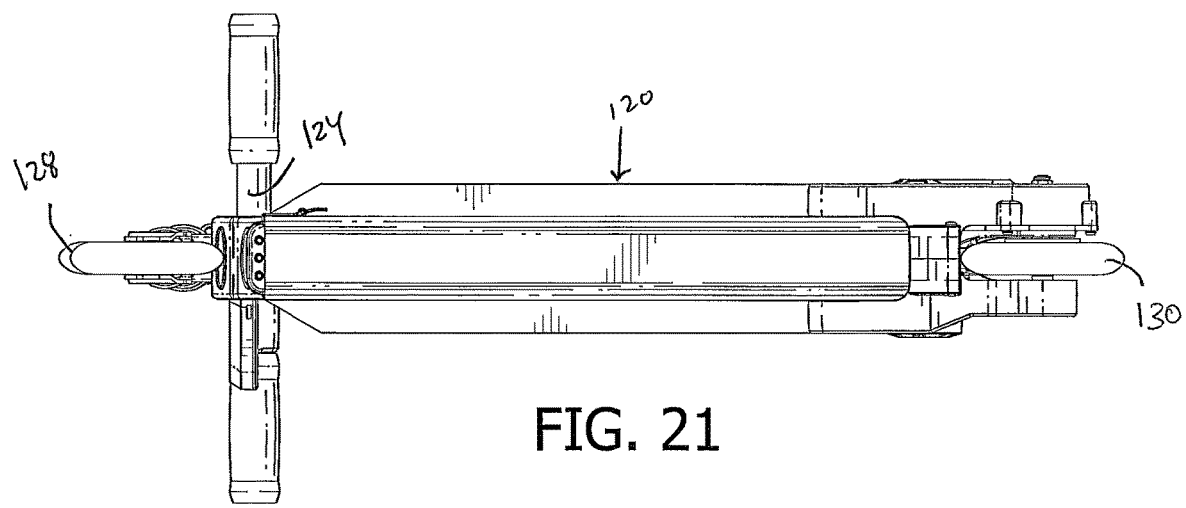
FIG. 21 is a bottom view of the scooter of FIG. 15.

FIGS. 11-13 illustrate the scooter 10 in a folded configuration. As discussed above, the folding assembly 70 allows the handlebar assembly 24 to pivot relative to the body 20 such that the rotatable shaft 32 and the handlebar assembly 24 fold against to the body 20 for compact transport and storage of the scooter 10. As shown in FIGS. 11-13, when the scooter 10 is in the folded configuration, the handlebar assembly 24 can be positioned generally parallel to the body 20. The folding assembly 70 includes a release mechanism 72. The release mechanism 72 can include a handle, button, lever, and/or knob, among mechanical mechanisms. For example, in the illustrated embodiment, the release mechanism 72 includes a handle that, in a first position, locks the rotatable shaft 32 in a substantially upright or riding position and in a second position, allows the rotatable shaft to pivot about a pivot connection 74 (shown in FIG. 13) between the rotatable shaft 32 and the body 20 such that the rotatable shaft 32 is substantially parallel with a longitudinal axis of the body 20, as shown in FIG. 11. In some embodiments, the release mechanism 72 is in wired and/or wireless communication with the controller to receive instructions to release and/or lock the folding assembly 70. In some embodiments, when the scooter 10 is in the folded configuration, the handlebar assembly is positioned adjacent or near the brake mechanism 96. In some embodiments, the handlebar assembly 24 abuts and/or touches the brake mechanism 96 and can cause the brake mechanism 96 to contact the rear wheel 30 or otherwise lock the rear wheel 30 to prevent rotation of the rear wheel 30.

Some embodiments of the electric scooter 10 comprises a battery housing 22 comprising a controller and at least one battery 21. As shown, the housing 22 can be mounted to the underside of the scooter body 20 underneath the support surface 34. As illustrated in FIGS. 11 and 12, the battery 21 is insertable and/or removable from the battery housing 22 when the scooter 10 is in a folded configuration. The battery 21 may be any type of battery, such as a lithium ion rechargeable battery. For example, the battery can have an approximate 1.5-2.5 hour discharge time. As illustrated, the battery 21 can be inserted and/or removed along a direction that is generally parallel with a longitudinal axis of the body 20.

FIG. 13 illustrates a cross-sectional view of the scooter 10 in the folded configuration. As shown, the battery housing 22 can be located at the forward end of the body 20 of the scooter 10. This arrangement facilitates easy removable and replacement of the battery 21 when the scooter is in a folded configuration, allowing access to the battery housing 22. The battery housing can include an aperture on the forward end of the body 20. The housing 22 can include a closure feature, such as a door (not shown), to close the aperture. In some embodiments, the body 20 and/or the battery 21 comprise a securing feature, such as a detent or hook, configured to secure the battery within the housing 22. The securing feature can include a release, such as a button or latch, that disengages the securing feature and/or enables the battery 21 to be removed from the housing 22.

The battery 21 can be configured to be moved into and out of the housing 22. For example, the battery 21 can be slid into and out of the housing 22 along an axis that is generally parallel with a longitudinal axis of the body 20. In certain implementations, the battery 21, when received in the housing 22, is positioned forward of a front to rear midpoint of the body 20. This can aid in moving the center of gravity of the scooter forward, which can provide advantages in riding characteristics. In some variants, the battery 21 is configured to be received in a cavity in a rear of the scooter, such as near the rear wheel 30. This can increase the amount of weight that is distributed to the rear wheel, which can increase traction of the rear wheel 30.

The body 20 can include a middle connection piece 23 to provide a point of connection between the support surface 34 and the body 20, as well as provide additional stability and support. A controller 25 can be located rearward of the battery 21 of the body 20 below the support surface 34. In some embodiments, the controller 25 is close to the motor 93 and/or between the motor 93 and the battery 21. In some embodiments, during assembly, the controller 25 may be coupled to the middle connection piece 23, such as by a clip-in connection, friction fit, fasteners, or otherwise.

As discussed above, some embodiments comprises the motor 93, such as an electric motor. The motor 93 can be mounted to the underside of the scooter body 20 underneath the support surface 34, mounted on a rear end of the support surface 34 adjacent the rear drive assembly 80, mounted on a front end of the support surface 34 adjacent the front wheel 28, mounted on the handlebar assembly 24 or fork 31, and/or in any other location. The motor can be operably coupled to the at least one rear wheel 30 to provide powered rotational force upon the at least one rear wheel 30. In some embodiments, the battery housing 22 and the motor 93 can be located or supported at different locations on the scooter 10, including on top of the support surface 34 or adjacent either the front or rear wheel 28, 30.

In various embodiments, the controller 25 can receive a signal from the throttle assembly 26. For example, the controller 25 can receive a signal indicative of the amount of speed and/or power to apply to the rear wheel 30. The controller 25 can provide two-way or one-way transmission to the motor 93. For example, the controller 25 can instruct the motor 93 to drive the wheel 30 in response to and/or consistent with the signal from the throttle assembly 26. While control of the scooter 10 can be wireless via the wireless throttle assembly 26, some variants have wired connections may be provided to connect the throttle, brake, and on/off switch to the motor 93. Any wired or wireless protocol may be used.

In some embodiments, the scooter 10 includes no wires connecting the battery 21, controller 25, and motor 93. In some embodiments, a conductive material, such as copper, may be incorporated into the body 20 of the scooter 10 once the body 20 has been formed (e.g., injection molded). The conductive material running through the injection molded body 20 acts as a conductor and electrically connects the battery 21, motor 93, and controller 25 to control driving operation of the rear wheel 30. The rear drive assembly 80 may, in some embodiments, be a single module or assembly with the controller and battery separate modules that may be coupled to or inserted within the body 20 during manufacture.

FIGS. 15-21

FIGS. 15-21 illustrate another embodiment of a scooter 110. The scooter 110 is similar or identical to the scooter 10 discussed above in many respects. As shown in FIGS. 15-21, the scooter 110 can include a scooter body 120, a support surface 134, a rotatable shaft 132, and a handlebar assembly 124, which can be similar to the scooter body, the support surface, the rotatable shaft, and the handlebar assembly discussed above in connection with the scooter 10. The scooter 110 can include any one, or any combination, of the features of the scooter 10.

For example, the scooter 110 includes at least one front wheel 128 and at least one rear wheel 130 connected with the scooter body 120. The front wheel 128 and the rear wheel 130 can be spaced apart from one another with the support surface 134 extending therebetween. The wheels 128, 130 can be aligned in substantially the same plane, as depicted, and/or located at opposite ends of the support surface 134. As depicted, some embodiments of the scooter 110 include a rotatable shaft 132 which rotates with the handlebar assembly 124 so that the handlebar assembly 124 can rotate or swivel within a head tube of the scooter body 120.

In some embodiments, the scooter 110 includes a folding assembly 170 and/or a motor assembly, such as a rear drive assembly 180. The folding assembly 170 allows the handlebar assembly 124 and the rotatable shaft 132 to pivot relative to the body 120 such that the handlebar assembly 124 folds against the body 120 for compact transport and storage of the scooter 110. As shown in FIGS. 15-21, when the scooter 110 is in the folded configuration, the handlebar assembly 124 can be positioned generally parallel to the body 120. The folding assembly 170 includes a release mechanism 172. The release mechanism 172 includes a knob that, in a first position, locks the rotatable shaft 32 in a substantially upright or riding position and in a second position, allows the rotatable shaft to pivot about a pivot connection 174 between the rotatable shaft 132 and the body 120 such that the rotatable shaft 132 is substantially parallel with a longitudinal axis of the body 120. For example, the release mechanism 172 can be rotated in a first direction to lock the rotatable shaft 132 and a second direction, opposite the first direction, to release the rotatable shaft 132 and allow the rotatable shaft 132 to pivot about the pivot connection 174.

In some embodiments, the rear drive assembly 180 includes a gear box housing 187, which can at least partially enclose a gear set. The gear box housing 187 may be part of the main structure of the rear deck or body of the scooter 110. A portion of the gear set 189 can be enclosed on the outside with a gear box side piece 192. As shown, the side piece 192 can include a stepped configuration. For example, the stepped configuration can include a first portion 192a and a second portion 192b. As shown in the illustrated configuration, the first portion 192a is substantially flat and the second portion 192b includes a stepped section that protrudes outwardly from first portion 192a and is laterally offset from the first portion 192a. The stepped section can be positioned at least partially adjacent the motor and can extend a portion of the first portion 192a. The side piece 192 can include one or more apertures 191, such as to allow airflow from ambient to the motor 193 for cooling. The apertures 191 can be positioned between the first portion 192a and the second portion 192b and at least partially surround an end of the motor 193 to allow airflow to directly contact the motor 193 for cooling.

In some embodiments, the rear drive assembly 180 includes a side piece 190 that is removable to provide access to the rear wheel 130 in case the rear wheel should need repair or replacement, such as due to wear, etc. The side piece 190 can be connected to the rear drive assembly 180 to surround at least a portion of the rear drive assembly 180 and can be positioned opposite the side piece 192, with the gear box housing 187 extending therebetween. As shown in the illustrated embodiment, the side piece 190 can be substantially flat.

As also shown, the motor 193 can be contained in a protective shell, such as a generally cylindrical casing 197. In some embodiments, the side piece 190 and the casing 197 form a unitary and/or integral unit. In other embodiments, the casing 197 is separate from the side piece 190. In some embodiments, the casing 197 is formed as part of the motor 193 and includes one or more apertures to allow airflow from ambient to the motor 193 for cooling.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Although this invention has been disclosed in the context of certain embodiments and examples, it will be understood by those skilled in the art that the present disclosure extends beyond the specifically disclosed embodiments to other alternative embodiments and/or uses of the invention and obvious modifications and equivalents thereof. In particular, while the present systems and methods have been described in the context of particular embodiments, the skilled artisan will appreciate, in view of the present disclosure, that certain advantages, features and aspects of the systems and methods may be realized in a variety of other applications, many of which have been noted above. Various features and aspects of the disclosed embodiments can be combined with or substituted for one another in order to form varying modes of the conveyor. The scope of this disclosure should not be limited by the particular disclosed embodiments described herein.

Additionally, it is contemplated that various aspects and features of the invention described can be practiced separately, combined together, or substituted for one another, and that a variety of combination and subcombinations of the features and aspects can be made and still fall within the scope of the invention. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of personal mobility devices, such as scooters, have been disclosed. Although the devices have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

What is claimed is:

1. A two-wheel scooter comprising:
   a body comprising a deck, a front end, a rear end, and a longitudinal axis, the deck configured to support a user;
   a steering assembly connected to the front end of the body, the steering assembly comprising a handlebar, a steering shaft, and a front wheel;
   a rear wheel connected to the rear end of the body;
   a rear drive assembly configured to drive the rear wheel, the rear drive assembly comprising an electric motor and a transmission;
   a battery housing under the deck, the battery housing comprising an aperture; and
   a battery in the battery housing, the battery configured to provide electric power to the electric motor, the battery selectively removable from the battery housing through the aperture along a direction that is generally parallel with the longitudinal axis of the body, wherein when the battery is in the battery housing a front end of the battery protrudes longitudinally frontward from the front end of the body, thereby providing a grasping portion to aid removal of the battery.

2. The scooter of claim 1, further comprising a folding assembly that connects the steering assembly and the body, the folding assembly comprising a hinge and a lock, the folding assembly configured to enable the steering assembly to pivot relative to the body between an unfolded state and a folded state, wherein:
   in the unfolded state, the steering assembly blocks removal of the battery from the battery housing; and
   in the folded state, the steering assembly does not block removal of the battery from the battery housing.

3. The scooter of claim 2, wherein, in the unfolded state and with the front and rear wheels on a riding surface, the battery is directly below the folding assembly.

4. The scooter of claim 1, wherein the direction is toward the front end of the body.

5. The scooter of claim 1, wherein the aperture is on a front end of the battery housing.

6. The scooter of claim 1, wherein the battery housing is connected to the front end of the body.

7. The scooter of claim 1, wherein the rear drive assembly is configured to drive the rear wheel in a first rotational direction and is configured to allow the rear wheel to rotate freely in a second rotational direction opposite of the first rotational direction.

8. A method of replacing a spent battery in an electric scooter, the method comprising:
   disengaging a lock of a folding assembly of the scooter;
   folding the scooter, wherein folding the scooter comprises:
      pivoting in a first rotational direction the steering assembly of the scooter relative to a body of the scooter; and
      activating, with the steering assembly, a brake of the scooter against a rear wheel of the scooter;
   withdrawing the spent battery from the body in a first linear direction generally parallel to a longitudinal axis of the body;
   inserting a fresh battery into the body in a second linear direction generally parallel to the longitudinal axis;
   unfolding the scooter, wherein unfolding the scooter comprises pivoting in a second rotational direction the steering assembly relative to the body; and
   engaging the lock of the folding assembly.

9. The method of claim 8, wherein the first linear direction is toward a front of the scooter and the second linear direction is toward a rear of the scooter.

10. The method of claim 8, wherein folding the scooter further comprises moving a front wheel of the scooter out of a position that blocks withdrawal of the spent battery, and wherein unfolding the scooter further comprises moving the front wheel into a position that blocks withdrawal of the fresh battery.

11. The method of claim 8, wherein withdrawing the spent battery from the body comprises grasping a front of the battery that protrudes from the body of the scooter.

12. A two-wheel scooter comprising:
a body comprising a deck, a front end, a rear end, and a longitudinal axis, the deck configured to support a user;
a steering assembly connected to the front end of the body, the steering assembly comprising a handlebar, a steering shaft, and a front wheel;
a rear wheel connected to the rear end of the body;
a rear drive assembly configured to drive the rear wheel, the rear drive assembly comprising an electric motor and a transmission;
a battery configured to provide electric power to the electric motor;
a brake configured to move into contact with the rear wheel; and
a folding assembly configured to enable the steering assembly to pivot relative to the body between an unfolded state and a folded state, wherein in the folded state the steering assembly contacts the brake, thereby inhibiting rotation of the rear wheel.

13. The scooter of claim 12, wherein the folding assembly comprises a hinge and a lock.

14. The scooter of claim 13, wherein the lock comprises a rotatable knob.

15. The scooter of claim 12, wherein the battery is selectively removable from the body along a direction that is generally parallel with the longitudinal axis of the body.

16. The scooter of claim 12, wherein the brake is configured to be activated by a rider's foot.

17. The scooter of claim 12, wherein the rear drive assembly is configured to drive the rear wheel in a first rotational direction and is configured to allow the rear wheel to rotate freely in a second rotational direction opposite of the first rotational direction.

18. A two-wheel scooter comprising:
a body comprising a deck, a front end, a rear end, and a longitudinal axis, the deck configured to support a user;
a steering assembly connected to the front end of the body, the steering assembly comprising a handlebar, a steering shaft, and a front wheel;
a rear wheel connected to the rear end of the body;
a rear drive assembly configured to drive the rear wheel, the rear drive assembly comprising an electric motor and a transmission;
a battery housing under the deck, the battery housing comprising an aperture;
a battery in the battery housing, the battery configured to provide electric power to the electric motor, the battery selectively removable from the battery housing through the aperture along a direction that is generally parallel with the longitudinal axis of the body; and
a folding assembly that connects the steering assembly and the body, the folding assembly comprising a hinge and a lock, the folding assembly configured to enable the steering assembly to pivot relative to the body between an unfolded state and a folded state, wherein:
in the unfolded state and with the front and rear wheels on a riding surface, the steering assembly blocks removal of the battery from the battery housing and the battery is directly below the folding assembly; and
in the folded state, the steering assembly does not block removal of the battery from the battery housing.

19. The scooter of claim 18, wherein the direction is toward the front end of the body.

20. The scooter of claim 18, wherein the aperture is on a front end of the battery housing.

21. The scooter of claim 18, wherein the battery housing is connected to the front end of the body.

22. The scooter of claim 18, wherein the rear drive assembly is configured to drive the rear wheel in a first rotational direction and is configured to allow the rear wheel to rotate freely in a second rotational direction opposite of the first rotational direction.

* * * * *